United States Patent
Noh et al.

(10) Patent No.: US 12,156,087 B2
(45) Date of Patent: Nov. 26, 2024

(54) METHOD AND APPARATUS FOR CONFIGURING AND INDICATING BEAM INFORMATION IN WIRELESS COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 17/267,679

(22) PCT Filed: Aug. 14, 2019

(86) PCT No.: PCT/KR2019/010354
§ 371 (c)(1),
(2) Date: Feb. 10, 2021

(87) PCT Pub. No.: WO2020/036433
PCT Pub. Date: Feb. 20, 2020

(65) Prior Publication Data
US 2021/0329517 A1 Oct. 21, 2021

(30) Foreign Application Priority Data

Aug. 17, 2018 (KR) .................. 10-2018-0096169
Oct. 31, 2018 (KR) .................. 10-2018-0132133

(51) Int. Cl.
*H04W 36/06* (2009.01)
*H04B 7/06* (2006.01)
(Continued)

(52) U.S. Cl.
CPC .......... *H04W 36/06* (2013.01); *H04B 7/0639* (2013.01); *H04B 7/0695* (2013.01); *H04L 5/001* (2013.01); *H04W 72/046* (2013.01)

(58) Field of Classification Search
CPC .. H04B 7/0626; H04B 7/0639; H04B 7/0695; H04B 7/088; H04L 1/0023;
(Continued)

(56) References Cited

U.S. PATENT DOCUMENTS

2015/0230263 A1    8/2015   Roy et al.
2016/0337881 A1   11/2016   Zhabg et al.
(Continued)

FOREIGN PATENT DOCUMENTS

CN          108199819 A     6/2018

OTHER PUBLICATIONS

Indian Office Action dated Nov. 22, 2022, issued in Indian Patent Application No. 202137006139.
(Continued)

*Primary Examiner* — Khoa Huynh
(74) *Attorney, Agent, or Firm* — Jefferson IP Law, LLP

(57) ABSTRACT

The present disclosure relates to a communication method for converging IoT technology with 5G communication systems for supporting higher data transmission rates than beyond 4G systems, and to a system therefor. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The present invention characterizes in a method for a terminal of a wireless communication system, wherein the method comprises the steps of: receiving channel or reference signal configuration information including beam-
(Continued)

related configuration information via higher layer signalling; transmitting and receiving the channel or a reference signal to and from a base station on the basis of the beam-related configuration information; receiving beam change information for the channel or reference signal; and transmitting and receiving the channel or reference signal of a plurality of component carriers to and from the base station on the basis of the beam change information, wherein the beam-related configuration information and the beam change information include transmission configuration indicator (TCI) state information of the channel or reference signal.

20 Claims, 25 Drawing Sheets

(51) Int. Cl.
*H04L 5/00* (2006.01)
*H04W 72/044* (2023.01)

(58) Field of Classification Search
CPC ....... H04L 1/0026; H04L 1/08; H04L 5/0007; H04L 5/001; H04L 5/0048; H04L 5/0053; H04L 5/0094; H04L 5/0096; H04W 36/06; H04W 72/046; H04W 74/08
See application file for complete search history.

(56) References Cited

U.S. PATENT DOCUMENTS

| 2019/0373450 | A1* | 12/2019 | Zhou | .................... | H04W 76/11 |
| 2019/0387579 | A1* | 12/2019 | Pao | ...................... | H04W 88/06 |
| 2020/0245166 | A1 | 7/2020 | Kwak et al. | | |
| 2021/0084623 | A1 | 3/2021 | Zhang et al. | | |

OTHER PUBLICATIONS

Huawei et al., 'CSI-RS design for beam management, R1-1712249, 3GPP TSG RAN WG1 Meeting #90, Prague, Czech Republic, Aug. 12, 2017.
ASUSTEK, 'Control of UE beamforming in RRC_CONNECTED', R1-1802018, 3GPP TSG-RAN WG1 Meeting #92, Athens, Greece, Feb. 18, 2018.
Qualcomm Incorporated: "Remaining details on QCL", 3GPP Draft; R1-1720672, Nov. 18, 2017.
Samsung: "Remaining details on QCL", 3GPP Draft; R1-1717634, Oct. 8, 2017.
Extended European Search Report dated Aug. 8, 2022, issued in European Patent Application No. 18182289.1.
NTT Docomo, Inc., Requirements for beam failure detection based on SSB and CSI-RS, R4-1806392, 3GPP TSG RAN WG4 Meeting #87, Busan, Korea, May 14, 2018.
Chinese Office Action dated Nov. 10, 2023, issued in Chinese Patent Application No. 201980053971.3.
Qualcomm Incorporated, Maintenance on Reference Signals and QCL, R1-1809424, 3GPP TSG RAN WG1 Meeting #94, Aug. 11, 2018.
Qualcomm Incorporated, Beam management for NR, R1-1809423, 3GPP TSG-RAN WG1 Meeting #94, Aug. 11, 2018.
3rd Generation Partnership Project; Technical Specification Group Radio Access Network; NR; Physical layer procedures for data (Release 15), 3GPP TS 38.214 V15.2.0 (Jun. 2018), Jun. 29, 2018.
Chinese Office Action dated Apr. 11, 2024, issued in Chinese Patent Application No. 201980053971.3.
Korean Office Action dated Mar. 29, 2024, issued in Korean Patent Application No. 10-2018-0132133.

* cited by examiner

BEAM SWEEPING FOR TRANSMISSION BEAM SELECTION

REPETITION FOR RECEPTION BEAM SELECTION

METHOD AND APPARATUS FOR CONFIGURING AND INDICATING BEAM INFORMATION IN WIRELESS COMMUNICATION SYSTEM

CROSS-REFERENCE TO RELATED APPLICATION(S)

This application is a continuation application, claiming priority under § 365 (c), of an International application No. PCT/KR2019/010354, filed on Aug. 14, 2019, which is based on and claims the benefit of a Korean patent application number 10-2018-0096169, filed on Aug. 17, 2018, in the Korean Intellectual Property Office, and of a Korean patent application number 10-2018-0132133, filed on Oct. 31, 2018, in the Korean Intellectual Property Office, the disclosure of each of which is incorporated by reference herein in its entirety.

TECHNICAL FIELD

The disclosure relates to a wireless communication system and, more particularly, to operations of a UE and a base station for configuring and indicating beam-related information such that the UE and the base station transmit/receive signals.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a 5G or NR system, a large number of antennas and transmission/reception in a high-frequency band (for example, 28 GHz) are supported, and this requires beamforming for overcoming the high level of rectilinear characteristics of signals and the large amount of path loss. Therefore, it is possible to configure and change beams that are applicable to various channels and reference signals in an NR system.

DISCLOSURE OF INVENTION

Technical Problem

In an NR system, a base station may configure an SSB or CSI-RS in a TCI state in order to indicate or configure beams for transmitting a downlink control signal, data, and a reference signal. In the case of a TRS for time and frequency information estimation, the same is configured based on a periodic CSI-RS. As a result, it is always necessary to refer to beam information through the periodic CSI-RS or SSB. RRC reconfiguration may then be always necessary to change the beam information a predetermined number of times or more. Therefore, the disclosure proposes a method and an apparatus for solving such an information absence problem while allowing a semi-persistent CSI-RS in the TRS. In addition, the disclosure proposes a method and an apparatus for applying beam change signaling to multiple component carriers, channels, or the like during beam change signaling, in order to reduce the signaling overhead during a beam change.

Solution to Problem

A method by a UE in a wireless communication system according to the disclosure for solving the above-mentioned problems may include: receiving channel or reference signal setting information including beam-related configuration information via higher layer signaling; transmitting or receiving a channel or a reference signal to or from a base station based on the beam-related configuration information; receiving beam change information for the channel or the reference signal; and transmitting or receiving the channel or the reference signal of a plurality of component carriers to or from the base station based on the beam change information, wherein the beam-related configuration information and the beam change information include transmission configuration indicator (TCI) state information of the channel or the reference signal.

In addition, the method may further include: transmitting, to the base station, UE capability information indicating that corresponding beams are supported between the plurality of component carriers. In addition, the beam change information may be at least one of higher layer signaling including the TCI state information, a medium access control (MAC) control element indicating activation, and downlink control information. In addition, the method may further include: based on the beam change information, identifying beams, which are to be changed, of the specific channel or the reference signal of the plurality of component carriers, identifying beams, which are to be changed, of a downlink or uplink channel and the reference signal of the plurality of component carriers, or identifying beams, which are to be changed, of the uplink or downlink channel and the reference signal of the plurality of component carriers.

In addition, a method by a base station in a wireless communication system may include: transmitting channel or reference signal setting information including beam-related configuration information via higher layer signaling; transmitting or receiving a channel or a reference signal to or from a UE based on the beam-related configuration information; transmitting beam change information for the channel or the reference signal; and transmitting or receiving the channel or the reference signal of a plurality of component carriers to or from the UE based on the beam change information, wherein the beam-related configuration information and the beam change information include transmission configuration indicator (TCI) state information of the channel or the reference signal.

A UE in a wireless communication system may include: a transceiver; and a controller connected to the transceiver and configured to perform control to: receive channel or reference signal setting information including beam-related configuration information via higher layer signaling; transmit or receive a channel or a reference signal to or from a base station based on the beam-related configuration information; receive beam change information for the channel or the reference signal; and transmit or receive the channel or the reference signal of a plurality of component carriers to or from the base station based on the beam change information.

The beam-related configuration information and the beam change information may include transmission configuration indicator (TCI) state information of the channel or the reference signal.

In addition, a base station in a wireless communication system may include: a transceiver; and a controller connected to the transceiver and configured to perform control to: transmit channel or reference signal setting information including beam-related configuration information via higher layer signaling; transmit or receive a channel or a reference signal to or from a UE based on the beam-related configuration information; transmit beam change information for the channel or the reference signal; and transmit or receive the channel or the reference signal of a plurality of component carriers to or from the UE based on the beam change information, wherein the beam-related configuration information and the beam change information include transmission configuration indicator (TCI) state information of the channel or the reference signal.

Advantageous Effects of Invention

As described above, the disclosure relates to a wireless communication system and, more particularly, proposes operations of a UE and a base station, which are necessary when the base station configures and indicates beam information to the UE during transmission of control signals, data, and reference signals.

According to the disclosure, dynamically changed beam information is indicated to a TRS through a semi-persistent CSI-RS such that the TRS can be transmitted/received based on various kinds of beam information. This enables efficient time and frequency tracking. In addition, beams of multiple component carriers and/or channels are changed through a single session of beam change signaling such that beam change signaling can be transmitted/received efficiently.

MODE FOR THE INVENTION

Figure 1:
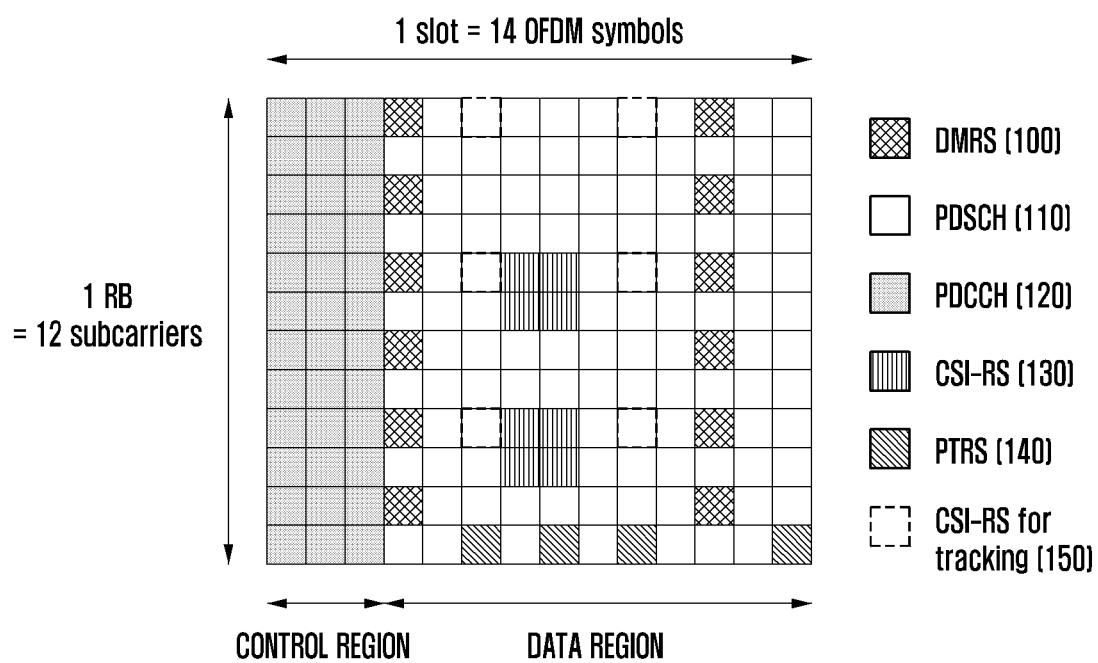
FIG. 1 illustrates radio resource setting of an LTE system.

The current mobile communication system has evolved into a high-speed and high-quality wireless packet data communication system to provide data and multimedia services, departing from the early stage of providing only voice-oriented services. To this end, the 3rd generation advanced mobile communication system, by employing a multiple access scheme using multi-carriers, is in the process of standardization by many standardization organizations, such as 3rd generation partnership project (3GPP), 3rd generation partnership project 2 (3GPP2), institute of electrical and electronics engineers (IEEE), etc. In recent years, various mobile communication standards, such as long term evolution (LTE) of 3GPP, ultra-mobile broadband (UMB) of 3GPP2, 802.16m IEEE, etc., have been developed to support a high quality and high speed wireless packet data transmission service with high quality and high speed, based on a multiple access scheme using multi-carriers.

The existing 3rd generation advanced mobile communication systems, such as LTE, UMB, 802.16m, etc., have employed, based on a multi-carrier multiple access scheme, various technologies, such as multiple input multiple output (MIMO, hereinafter interchangeably used with multi-antenna) to improve the transmission efficiency, beam-forming, adaptive modulation and coding (AMC), channel sensitive scheduling method, etc.

These technologies employ techniques that focus on transmission power via a plurality of antennas or adjust an amount of transmission data, according to the channel quality, etc., and selectively transmit data to users of high channel quality, thereby improving the transmission efficiency and the system throughput performance. Since most of these techniques are used based on channel state information of a channel between a base station (this is interchangeably used with evolved Node B (eNB) or BS) and a terminal (this is interchangeably used with a user equipment (UE) or mobile station (MS)), the eNB or UE needs to measure the channel state between the base station and UE. Here, in order to measure the channel state, a channel state indication reference signal (CSI-RS) is used. The eNB described above refers to a downlink transmitter and an uplink receiver located in a predetermined place. One mobile communication system includes a plurality of eNBs geographically distributed in an area, each of which performs the transmission/reception for a plurality of cells.

The existing 3rd-generation and 4th-generation mobile communication systems, such as an LTE and LTE-advanced (LTE-A) system, adopt MIMO technique of using multiple transmission/reception antennas in order to improve the data rate and system throughput. The MIMO technique includes transmitting multiple information streams separated spatially by using multiple transmission/reception antennas. This technique of transmitting spatially separated multiple information streams is referred to as spatial multiplexing. In general, the number of information streams for spatial multiplexing is determined depending on the numbers of transmission/reception antennas. Typically, the number of information streams that can be spatially multiplexed is referred to as a rank of the corresponding transmission. In the MIMO technique supported by standards up to the LTE/LTE-A Release 11, spatial multiplexing for 16 transmission antennas and 8 reception antennas is supported and up to 8 ranks are supported.

New radio access technology (NR), which is a 5th-generation (5G) mobile communication system currently being discussed, has a design purpose of being a system to support various services such as enhanced mobile broadband (eMBB), massive machine type communications (mMTC), ultra-reliable and low-latency communications (URLLC), and the like. For this purpose, NR minimizes the always-on reference signal and makes it possible to use the time and frequency resources flexibly by allowing the reference signal to be transmitted aperiodically.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, the specification has been described using an NR system, a long term evolution (LTE) system, and an LTE-Advanced (LTE-A) system as examples, but the disclosure can be applied to a similar communication system without any addition or subtraction.

In addition, in the specification, higher layer signaling in the specification is a signal transmission method in which signals such as radio resource control (RRC) signaling, packet data convergence protocol (PDCP) signaling, and a medium access control (MAC) control element (CE) are transmitted from a base station to a UE by using a downlink data channel (e.g., PDSCH) of a physical layer or are transmitted from a UE to a base station by using an uplink data channel (e.g., PUSCH) of the physical layer.

FIG. 1 illustrates radio resources of one subframe, slot, and one resource block (RB), which are minimum units that can be downlink-scheduled in a mobile communication system of the disclosure.

Referring to FIG. 1, the radio resource includes one subframe (or it may be referred to as a "slot") on the time axis and one RB on the frequency axis. This radio resource includes 12 subcarriers in the frequency domain and 14 OFDM symbols in the time domain, and thus has 168 natural frequency and time positions. In NR, as in LTE and LTE-A, each natural frequency and time position in FIG. 1 is referred to as a resource element (RE).

A plurality of different types of signals may be transmitted to the radio resource shown in FIG. 1.

1. Demodulation reference signal (DMRS) 100: This is a reference signal transmitted for a specific UE and is transmitted only when data is transmitted to a corresponding UE. In an LTE-A system, the DMRS may include a total of eight DMRS antenna ports (hereinafter, interchangeably used with ports). In LTE-A, ports 7 to 14 correspond to the DMRS ports, and the ports maintain orthogonality so that they do not interfere with each other using code division multiplexing (CDM) or frequency division multiplexing (FDM).

2. Physical downlink shared channel (PDSCH) 110: This is a data channel transmitted via downlink and is used for a base station to transmit traffic to a UE, and the traffic is transmitted using an RE to which a reference signal is not transmitted in a data region of FIG. 1.

3. Physical downlink control channel (PDCCH) 120: This is a control channel transmitted via downlink, and is a channel in which a base station indicates, to a UE, a variety of control information such as resource allocation for scheduling a PDSCH or a physical uplink shared channel (PUSCH), a modulation and coding scheme (MCS), a redundancy version (RV), a precoding resource block group (PRG), and the like.

4. Channel state information reference signal (CSI-RS) 130: This is a reference signal transmitted for UEs belonging to one cell, and is used to measure a channel state. A plurality of CSI-RSs can be transmitted to one cell. In LTE, the CSI-RSs are transmitted in predetermined time and frequency resources by using a predetermined pattern of a specific position, whereas in NR, the CSI-RSs are synchronized and used in free time and frequency positions with reference to (2, 1), (2, 2), and (4, 1) unit RE patterns based on frequency and time.

5. Phase tracking reference signal (PTRS) 140: This is a reference signal for estimating a phase that is rapidly changed in a high frequency band (for example, 28 GHZ) of 6 GHz or more, and can configure a position offset and a density. The use of the PTRS can be implicitly and dynamically indicated using MCS.

6. CSI-RS for tracking 150: There is a lack of a reference signal for synchronizing time and frequency in addition to a synchronization signal block (SSB) and a physical broadcast channel (PBCH) DMRS in accordance with the absence of cell specific RS (CRS) supported by LTE, so that RSs for such synchronization can be further allocated. Specifically, whether the corresponding CSI-RS is used for tracking within a CSI-RS set based on the CSI-RS can be configured using RRC.

In addition to the above signals, an NR system can configure a zero power (ZP) CSI-RS for muting and thus a CSI-RS transmitted by another base station can be received at UEs of the corresponding cell without interference. The ZP CSI-RS can be applied at a position where the CSI-RS can be transmitted. In general, a UE receives a traffic signal by skipping the corresponding radio resource, and the transmission power is not transmitted.

In addition, the UE may be allocated with CSI-IM (or interference measurement resources (IMR)) together with the CSI-RS. In the CSI-IM resources, resources (4, 1) or (2, 2) can be configured via higher layer signaling based on frequency and time. Such CSI-IM is a resource for allowing a UE to measure interference received when the UE receives a PDSCH. For example, when it is desired to measure the amount of interference when an adjacent base station transmits data and the amount of interference when the adjacent base station does not transmit data, a base station configures a CSI-RS and two CSI-IM resources. Here, one CSI-IM may cause the adjacent base station to always transmit a signal and the other CSI-IM may prevent the adjacent base station from always transmitting a signal, thereby effectively measuring the amount of interference of the adjacent base station.

In the case of the LTE-A system, a UE feeds back information on the channel state of the downlink to a base station so that the information can be utilized for downlink scheduling of the base station. That is, the UE measures a reference signal transmitted by the base station to the downlink, and feeds back information, extracted from the measured reference signal, to the base station in a form defined by LTE and LTE-A standards. Three types of information that the UE feeds back in LTE and LTE-A are as follows:

Rank indicator (RI): Number of spatial layers that a UE can receive in a current channel state.

Precoder matrix indicator (PMI): Indicator of a precoding matrix preferred by a UE in a current channel state Channel quality indicator (CQI): Maximum data rate that a UE can receive in a current channel state. The CQI can be replaced by a signal-to-interference-plus-noise ratio (SINR) that can be utilized in a similar manner to a maximum data rate, a maximum error correction code rate and a modulation scheme, data efficiency per frequency, and the like.

The RI, PMI, and CQI are related to each other and have related meanings. For example, the precoding matrices supported by LTE and LTE-A are defined differently for each rank. Therefore, a PMI value when the RI has a value of 1 and a PMI value when the RI has a value of 2 are understood differently even if the values of the RI are the same. In addition, when the UE determines the CQI, it is assumed that a rank value and a PMI value which are notified of to the base station by the UE are applied in the base station. That is, in a case where the UE notifies of RI_X, PMI_Y, and CQI_Z to the base station, when a rank is RI_X and a PMI is PMI_Y, it denotes that the UE can receive the data rate corresponding to CQI_Z. As described above, when the CQI is calculated, the UE assumes a transmission scheme to be performed by the base station, and thus optimized performance can be obtained when actual transmission is performed according to the corresponding transmission scheme.

Figure 2:
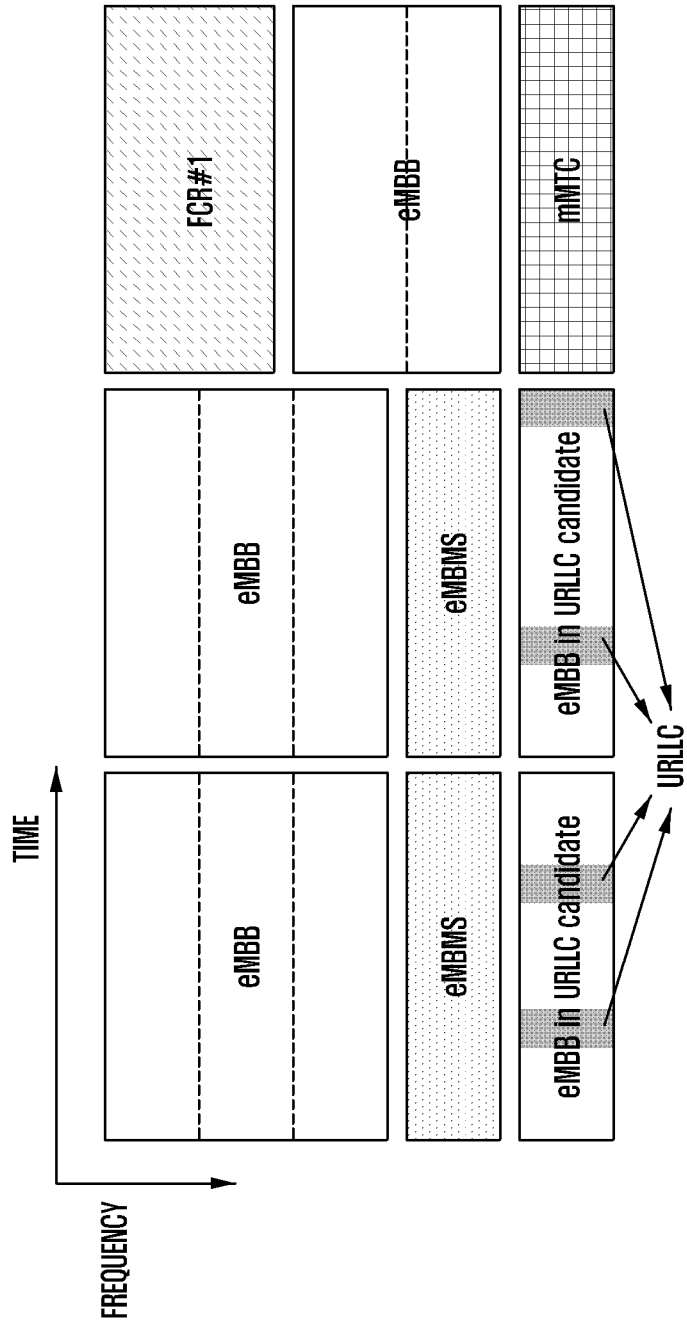
FIG. 2 illustrates radio resource setting of data, such as eMBB, URLLC, mMTC, etc., in an NR system.

FIG. 2 illustrates an example in which pieces of data such as eMBB, URLLC, and mMTC, which are services considered in an NR system, are allocated in a frequency-time resource together with a forward compatible resource (FCR).

If URLLC data is generated while eMBB and mMTC are allocated and transmitted in a specific frequency band and transmission of the URLLC data is required, a transmitter empties a pre-allocated portion of eMBB and mMTC data and transmits the URLLC data. Since a short delay time is particularly important in the URLLC among the above services, the URLLC data can be allocated to a portion of a resource allocated with eMBB and transmitted, and such an eMBB resource can be informed of to the UE in advance. To this end, the eMBB data may not be transmitted in the frequency-time resource where the eMBB data and the URLLC data overlap, and thus the transmission performance of the eMBB data may be lowered. That is, in the above case, an eMBB data transmission failure due to the URLLC allocation may occur. Here, the length of transmission time interval (TTI) used for the URLLC transmission may be shorter than the length of TTI used for the eMBB or mMTC transmission.

A synchronization signal is used to acquire synchronization with a cell in a network in a process of a UE accessing a wireless communication system. More specifically, the synchronization signal refers to a reference signal transmitted by the base station for time and frequency synchronization and cell search at the time of an initial access of the UE. In LTE, a signal such as a primary synchronization signal (PSS) and a secondary synchronization signal (SSS) may be transmitted for synchronization. In addition, in order to acquire synchronization with a cell through a cell search procedure and to access the cell, cell system information should be acquired and system information below can be transmitted through the PBCH and the PDSCH.

Here, the synchronization signal and the PBCH may be transmitted at regular intervals in the time axis, and can be transmitted within a predetermined transmission bandwidth in the frequency axis. A special sequence may be mapped to a subcarrier within the transmission bandwidth in order for the synchronization signal to indicate a cell number (ID), and the cell number may be mapped using a combination of one or a plurality of sequences. Therefore, the UE can detect the cell number to which the UE desires to access by detecting the sequence used for the synchronization signal.

Figure 3:
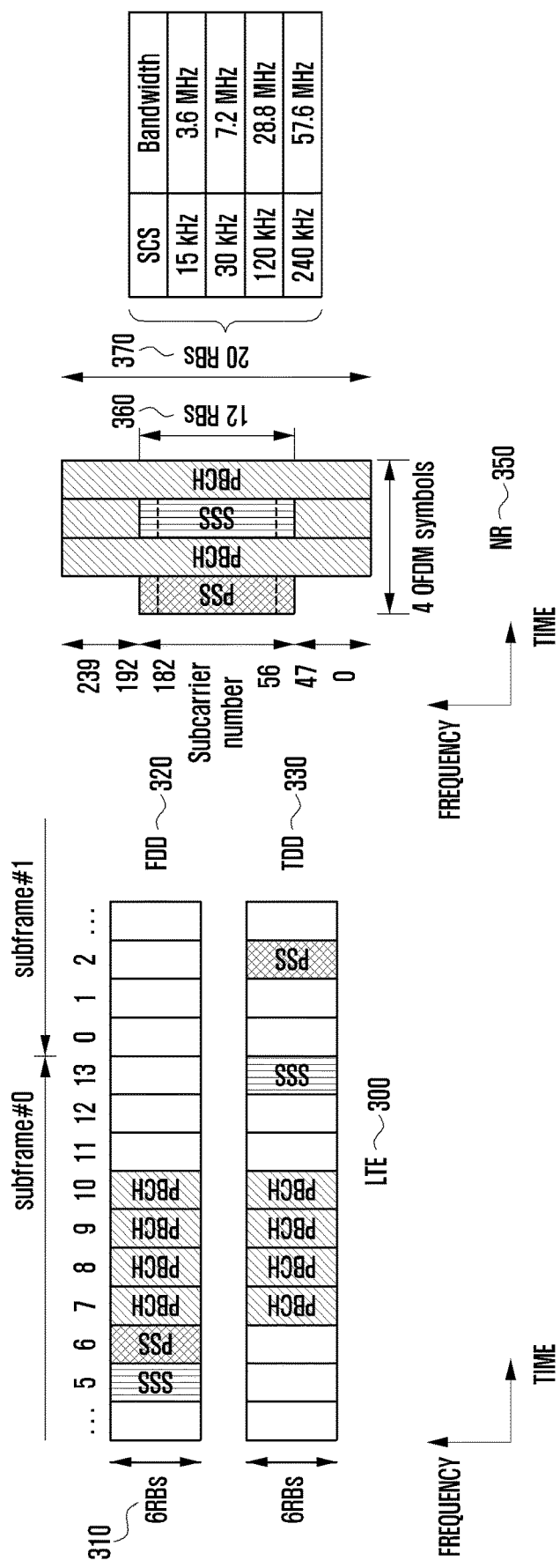
FIG. 3 illustrates a comparison between a PBCH and a synchronization signal transmitted in LTE and NR.

FIG. 3 illustrates the structures of a synchronization signal and a PBCH transmitted in LTE and NR, which are considered in the disclosure. Table 1 below is a table comparing channel structures of SS/PBCH blocks of LTE and NR.

TABLE 1

| LTE | | NR |
|---|---|---|
| Single | # SS/PBCH blocks | Multiple (per band) |
| 6 PRBs | SS/PBCH block bandwidth | 20 PRBs |
| 1 | # Symbol for PSS | 1 |
| 1 | # Symbol for SSS | 1 |
| 4 for SF #0 | # Symbol for PBCH | 2 + 1 multiplexed with SSS |
| 62 + 10 empty | # REs for PSS | 127 + 17 empty |
| 62 + 10 empty | # REs for SSS | 127 + 17 empty |
| 240 | # REs for PBCH | 432 |
| 48 | # REs for RS | 144 (Density: 3 REs/RB/Symbol) |
| Different | TDD vs FDD | Unified |

Referring to FIG. 3, as shown in Table 1, in LTE 300, a PSS, an SSS, and a PBCH are transmitted using the same frequency resource (6 PRBs) 310 on the frequency axis. However, in an NR 350, the amount of resources occupied on the frequency is 12 PRBs 360 for the PSS and the SSS and the amount thereof is 20 PRBs 370 for the PBCH, which are different from each other. In addition, a TDD 330 and an FDD 320 in LTE 300 have different transmission positions, but the TDD and the FDD in NR 350 all have the same transmission position. Table 2 below compares PSS sequences in LTE and NR.

TABLE 2

| LTE | | NR |
|---|---|---|
| ZC-sequence | Sequence Type | M-sequence |
| 63 | Sequence Length | 127 |
| 3 | # Sequences | 3 |
| 3 root indices of ZC-sequences | How to Represent Cell ID Info | 3 cyclic shifts of single M-sequence |
| No modulation | Modulation | BPSK |
| DC subcarrier is truncated (62 REs) | Mapping to REs | DC subcarrier is not truncated (127 REs) |

As mentioned in the above Table 2, in LTE, the PSS uses a Zadoff-Chu sequence having a constant amplitude zero auto correlation (CAZAC) characteristic. However, in NR, an M-sequence which is a pseudo random sequence is used. LTE and NR are the same in that they support three sequences. Table 3 below compares SSS sequences in LTE and NR.

TABLE 3

| LTE | | NR |
|---|---|---|
| M-sequence | Sequence Type | Gold-sequence (XOR of 2 M-sequences) |
| 31 | Sequence Length | 127 |
| Cell ID and half radio frame timing (504*2) | Carried Info(# sequences) | Cell ID only (1008) |
| interleaved two M-sequences, where each M-sequence carries part of the cell ID info, and a further scrambling carries the half radio frame timing | Construction Method | each of the M-sequences carries part of the cell ID info |
| BPSK | Modulation | BPSK |
| DC subcarrier is truncated (62 REs) | Mapping to REs | DC subcarrier is not truncated (127 REs) |

As mentioned in the above Table 3, unlike LTE, which has used an M-sequence of length of 31, NR supports SSS through a gold sequence of length of 127. In LTE, a PSS is generated using three Zadoff-Chu sequences as described above, and an SSS is generated using an M-sequence. Here, the PSS of one cell may have three different values according to a physical layer cell ID of the cell, and the three cell IDs of one cell ID group correspond to different PSSs. Accordingly, the UE may detect the PSS of the cell to identify one cell ID group among the three cell ID groups supported by LTE. The UE additionally detects an SSS among 168 cell IDs, reduced from 504 cell IDs, through the cell ID group identified through the PSS, so as to determine the cell ID to which the corresponding cell belongs. In NR, the UE identifies three cell ID groups through the PSS based on the M-sequence and detects 336 cell ID groups by using the SSS based on the gold sequence, thereby finally detecting one cell ID among 1008 cell IDs.

Thereafter, as to PBCH transmission, the PBCH transmission in NR has many differences with LTE in the channel coding and the reference signal. Table 4 below compares a difference in the PBCH transmission between LTE and NR.

TABLE 4

| LTE | | NR |
|---|---|---|
| Tail-Biting Convolutional Code (TBCC) | Channel coding | Polar codes, same as PDCCH |
| QPSK | Modulation | QPSK |
| Frequency-first, time-second | Resource mapping | Frequency-first, time-second |
| 1/2/4 ports (UE blind detection with CRC mask) | Transmission scheme | 1 port, and same as SSS |
| 4 ms | TTI | 80 ms |

As shown in the above Table 4, in LTE, the PBCH is transmitted every 40 ms based on TBCC, but in NR, the PBCH is transmitted every 80 ms using a polar code. Here, unlike in LTE where channel estimation is performed on PBCH by using CRS, NR estimates a channel for PBCH decoding by using PBCH DMRS. In NR, the above-mentioned PSS, SSS and PBCH are combined and called SS blocks (which can be interchangeably used with SSB, SS/PBCH, SS/PBCH block, etc.). The NR system allows the SS and PBCH to be transmitted using different beams by allowing transmission of these multiple SS blocks.

Figure 4:
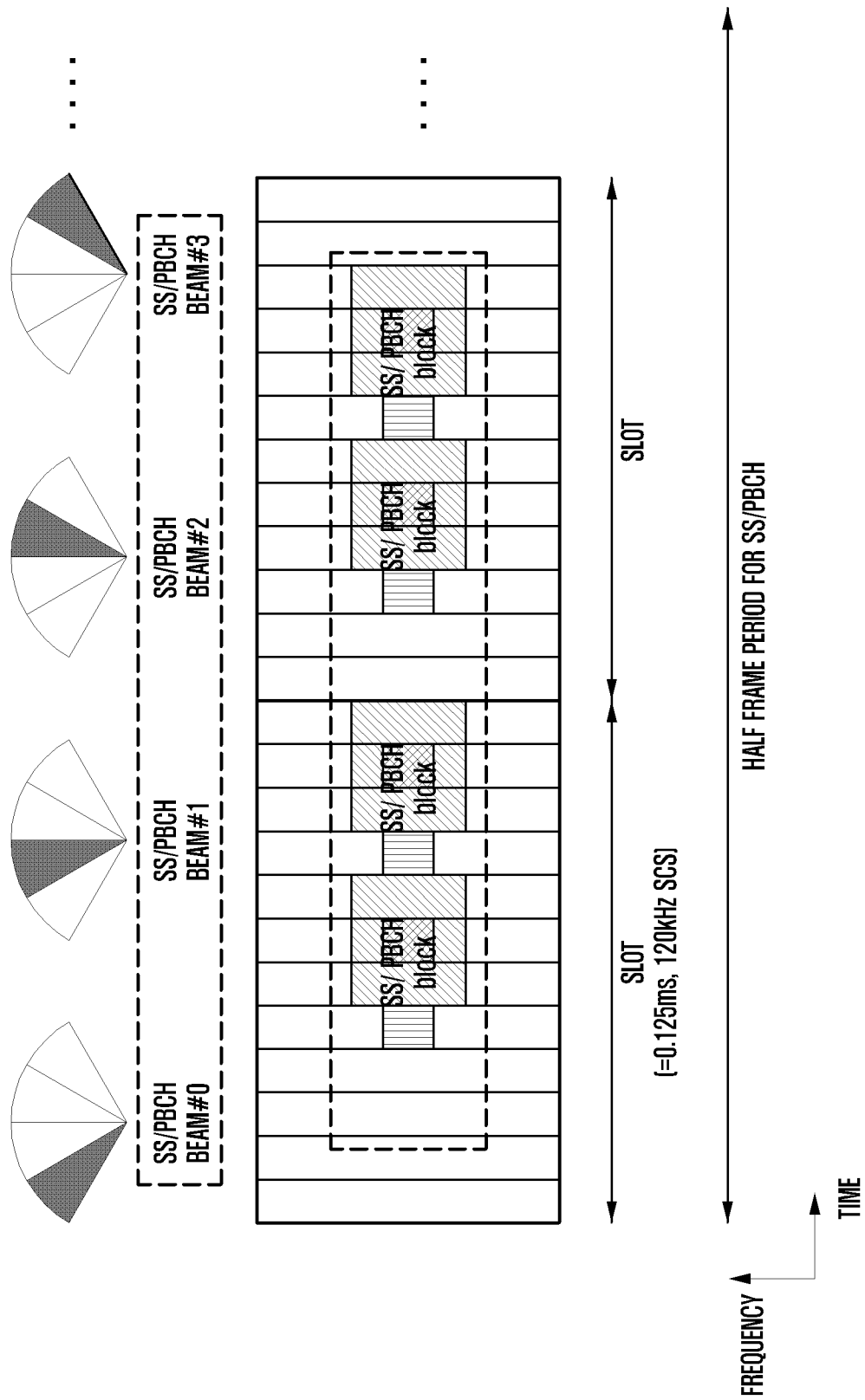
FIG. 4 illustrates an example in which a plurality of SS blocks are transmitted using different beams.

FIG. 4 illustrates an example in which a plurality of SS blocks are transmitted using different beams. Referring to FIG. 4, the SS block in NR includes PSS, SSS, and PBCH, and a plurality of SS blocks may be transmitted to a UE. Here, each of the SS blocks may be transmitted to the UE by using a different beam. For example, the SS blocks shown in FIG. 4 are transmitted using beams #0, #1, #2, and #3, respectively.

Information transmitted through the PBCH in the SS block is also changed in comparison with LTE. Table 5 below compares master information block (MIB) information transmitted through the PBCH in LTE and NR.

TABLE 5

| LTE | | NR |
|---|---|---|
| 3 bits | Channel bandwidth | |
| 3 bits | PHICH configuration | |
| 8 LSBs of SFN | System Frame Number (SFN) | 10 bits of SFN |
| | MSB of SS/PBCH block index | 3 bits (>6 GHz) |
| | Half frame timing | 1 bit |
| | Subcarrier spacing for common control | 1 bit |
| | SS/PBCH subcarrier offset | 4 bits + 1 bit (<6 GHz) |
| | DMRS Type A position for PDSCH | 1 bit |
| | SIB1 PDCCH configuration | 8 bits |
| | Cell barring info | 2 bits +1 bit reserved |
| 10 bits | Spare | 1 bit (>6 GHz), 2 bits (<6 GHz) |
| 16 bits | CRC | 24 bits |
| 40 bits | Total payload size | 56 bits |

In order to transmit the above information, the base station encodes the MIB and transmits the encoded MIB on the PBCH. As shown in Table 5, in the PBCH of NR, the channel bandwidth and PHICH configuration-related information supported by LTE are removed. However, various information such as a most significant bit (MSB) of an SS/PBCH block index, half frame timing, a subcarrier spacing for a common control channel, SS/PBCH subcarrier offset, and the like are added to the PBCH of NR. In particular, the MSB of the SS/PBCH block index provides MSB information of the SS block index for supporting a plurality of SS blocks, and thus transmission of a plurality of SS blocks is possible. The UE transmits beam-based physical random-access channel (PRACH) to the base station by using PRACH resources allocated for each SS block through the achievement of the SS block index, and thus a random access procedure required for initial access can be performed.

Figure 5:
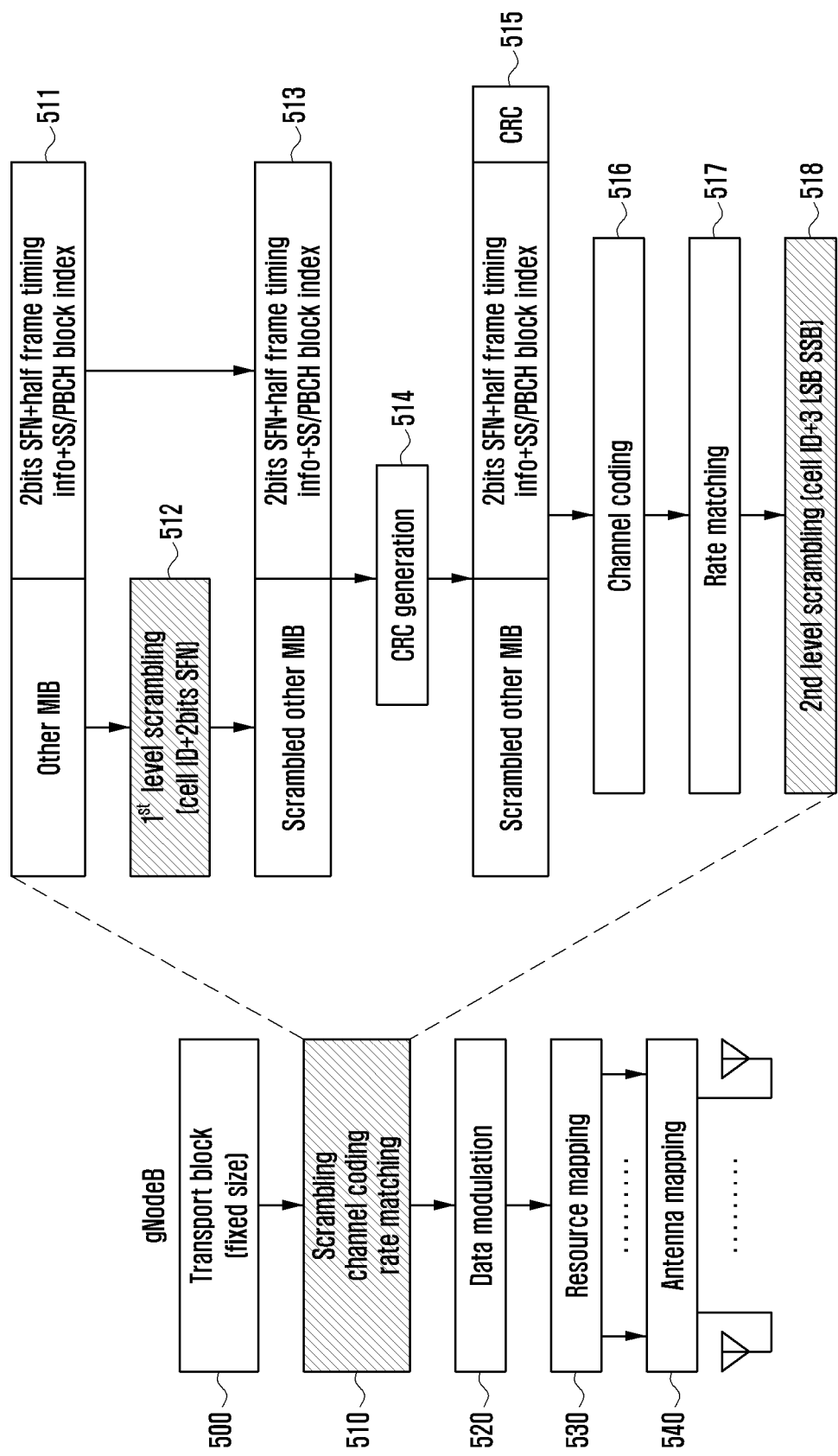
FIG. 5 illustrates a procedure in which a base station encodes a MIB to transmit the MIB to a PBCH.

FIG. 5 illustrates a procedure in which a base station encodes an MIB to transmit the MIB to a PBCH. Referring to FIG. 5, a base station (gNode B) performs scrambling, channel coding, and rate matching based on a transport block 500 of a fixed size in operation 510. Specifically, in operation 510, 2-bit system frame number (SFN), half frame timing information, and SS block index information are added to MIB information in operation 511. Next, the MIB information is scrambled based on a cell ID and the 2-bit SFN in operation 512, and the scrambled MIB information, 2-bit system frame number (SFN), half frame timing information, and SS block index information are generated in operation 513. Next, 24-bit cyclic redundancy check (CRC)

is generated based on the above information in operation 514 and is added to the above information in operation 515. Next, the above information is channel-coded in operation 516, rate-matched in operation 517, and re-scrambled based on 3-bit least significant bits (LSB) of the cell ID and SSB index in operation 518. Next, the scrambled information is demodulated in operation 520, mapped to resources in operation 520, and mapped to antennas and transmitted in operations 530.

Figure 6:
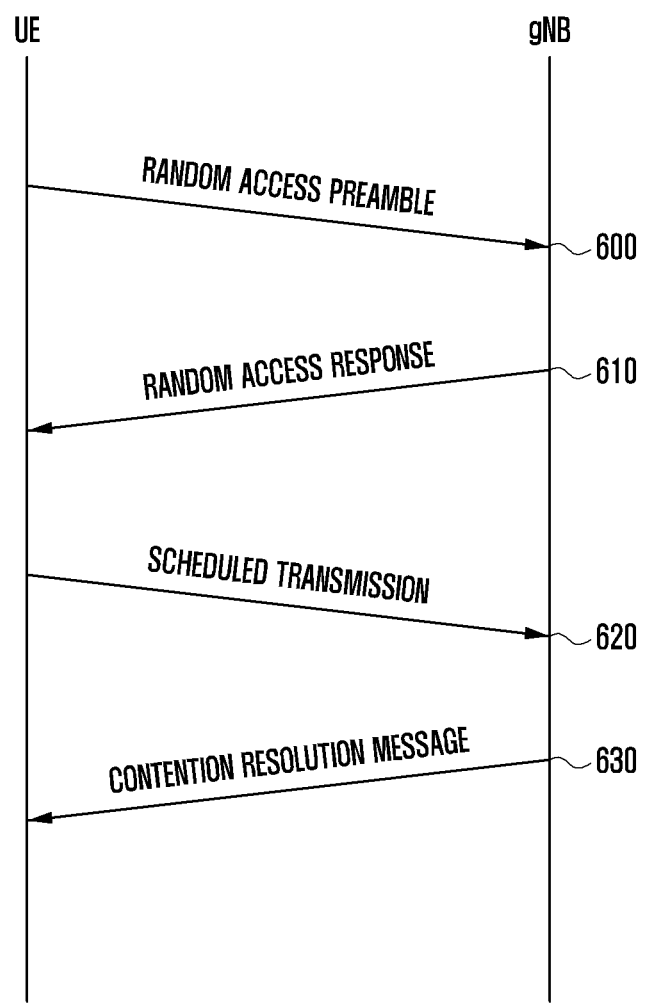
FIG. 6 illustrates a random-access procedure of a UE in NR.

FIG. 6 illustrates a random access procedure of a UE.

Referring to FIG. 6, a UE may detect a synchronization signal in the above-mentioned SS block and decode a PBCH. In operation 600, based on a preamble format and time and frequency resources identified based on the result reported in this manner, the UE may transmit a random-access preamble (hereinafter, which can be interchangeably used with Msg1) through a PRACH. After receiving the Msg1, a base station transmits a PDCCH for the transmission of Msg2 (hereinafter, which can be interchangeably used with a random-access response (RAR)) to the UE, and transmits the Msg2 to a resource allocated via the PDCCH through a PDSCH in operation 610. Next, in operation 620, the UE transmits Msg3 (which can be interchangeably used with scheduled transmission) to the base station to inform the base station that the UE has successfully received the Msg2. Next, the base station transmits a contention resolution message on the PDSCH to indicate that the contention has been resolved in operation 630.

Figure 7:
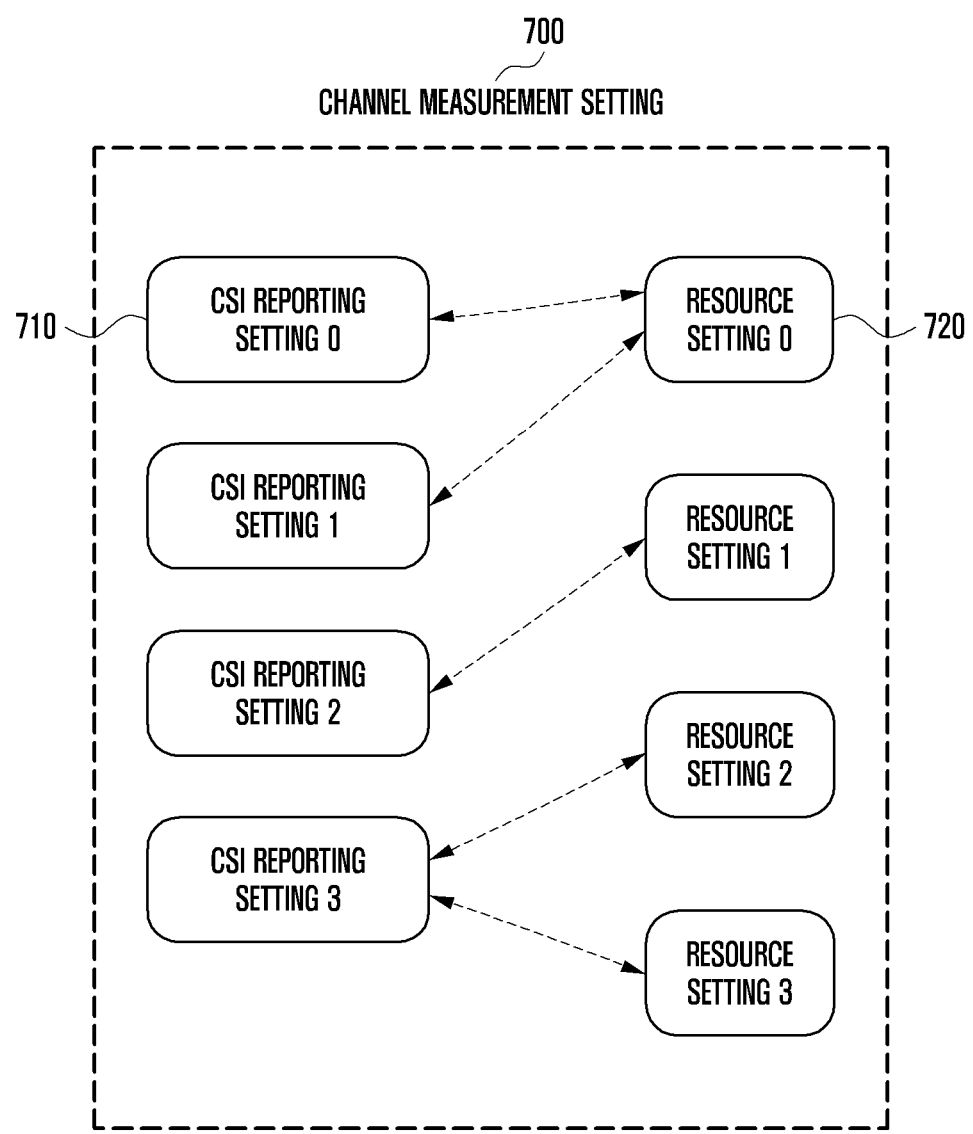
FIG. 7 illustrates a base station and a UE, which allow flexible setting through reference signal setting, CSI reporting setting, and CSI measurement setting in NR, and which perform a channel state reporting setting based thereon.

Unlike LTE, NR can support a more flexible channel state reporting setting than LTE through resource setting, channel measurement setting, and channel state reporting setting, which are required to support channel state information reporting. FIG. 7 illustrates resource setting, CSI measurement setting, and CSI reporting setting, which are required to support CSI reporting in NR. The resource setting, the CSI measurement setting, and the CSI reporting setting may include the following setting information.

CSI reporting setting 710: it is possible to set turning on and off of reporting parameters (e.g., RI, PMI, CQI, etc.), which are required for channel state reporting. It is possible to set the type of channel state reporting (e.g., type 1 (Type 1, implicit reporting type as channel state reporting having a low resolution) or type 2 (Type II, a type in which eigenvector, covariance matrix, and the like are explicitly reported using channel state reporting of a linear combination type as channel state reporting having a high resolution)). Specifically, it is possible to support: CSI reporting setting (whether reporting RI, PMI, CQI, beam indicator (BI), or a CSI-RS resource indicator (CRI) is possible in a separate setting or a combined setting); a reporting method (aperiodic and semi-persistent, as one among periodic, aperiodic, and semi-persistent, may be set as one parameter); codebook setting information; PMI type (wideband or partial band); channel state reporting type (implicit, explicit, Type I, or Type II); channel quality reporting type (CQI or RSRP); and resource setting for channel state reporting.

Resource setting 720: This is a setting including setting information for a reference signal required for channel state measurement. CSI-RS resources for channel and interference measurement and CSI-IM resources for interference measurement may be configured through the resource setting. To this end, a plurality of resource settings may exist. In addition, the transmission type (periodic, aperiodic, and semi-persistent) of the corresponding reference signal, transmission period and offset of the reference signal, and the like may be configured.

CSI measurement setting 700: This establishes mapping or connection between a CSI reporting setting and a resource setting. For example, if there are N CSI reporting settings and M resource settings, L links establishing mapping between these multiple CSI reporting settings and resource settings may be included in the CSI measurement setting. In addition, an association setting between the reference signal setting and the reporting time point may also be configured.

NR supports semi-persistent reference signal transmission and channel state information in addition to periodic and aperiodic channel state reporting supported by LTE. Table 6 below shows parameters configured in the CSI reporting setting (CSI Report Config).

TABLE 6

| Parameter name | Description | Value range |
|---|---|---|
| CSI-ReportConfigId | Report config ID | |
| ServCellIndex | Report serving cell ID | |
| resourcesForChannelMeasurement | NZP CSI-RS resource config ID for channel measurement | |
| csi-IM-ResourcesForInterference | CSI-IM resource config ID for interference measurement | |
| nzp-CSI-RS-ResourcesForInterference | NZP CSI-RS resource config ID for interference measurement | |
| reportConfigType | Transmission type of CSI reporting | periodic, semiPersistentOnPUCCH, semiPersistentOnPUSCH, aperiodic |
| reportQuantity | CSI parameters to be reported | none, cri-RI-PMI-CQI, cri-RI-i1, cri-RI-i1-CQI, cri-RI-CQI, cri-RSRP, ssb-Index-RSRP, cri-RI-LI-PMI-CQI |

TABLE 6-continued

| Parameter name | Description | Value range |
|---|---|---|
| reportFreqConfiguration | Reporting configuration on frequency domain | |
| cqi-FormatIndicator | CQI format | wideband CQI, subband CQI |
| pmi-FormatIndicator | PMI format | wideband PMI, subband PMI |
| csi-ReportingBand | CSI reporting band configuration | |

In the above, CSI-ReportConfigId is for configuring an ID of the corresponding CSI reporting setting, and ServCellIndex denotes an ID of a cell for reporting the corresponding CSI reporting, resourcesForChannelMeasurement denotes non-zero power channel state information reference signal (NZP CSI-RS) setting for measuring a signal channel used CSI reporting, and csi-IM-ResourcesForinterference denotes channel state information interference measurement (CSI-IM) setting for interference measurement. In addition, nzp-CSI-RS-ResourcesForinterference denotes NZP CSI-RS setting for measuring an interference channel used for CSI reporting. reportConfigType is a field for configuring the transmission type of the corresponding CSI reporting, and reportQuantity is a field for configuring CSI reporting parameters used in the corresponding CSI reporting, for example, CRI, RI, PMI, CQI, and the like. In the reportFreqConfiguration, frequency-related parameters used in the CSI reporting are included, cqi-FormatIndicator is a configuration for reporting either a wideband CQI or a subband CQI, and pmi-FormatIndicator is a configuration for reporting either a wideband PMI or a subband PMI.

Unlike LTE which supports reporting modes for periodic or aperiodic reporting modes, NR configures, in the CSI reporting setting as shown in the above Table 6, whether a PMI is a wideband PMI or a subband PMI or whether a CQI is a wideband CQI or a subband CQI. In addition, csi-ReportingBand is a configuration for a subband that needs to be reported among the entire subband.

Since semi-persistent CSI reporting in NR supports dynamic activation and deactivation in comparison with periodic CSI reporting, it requires relatively high UE complexity. However, physical uplink control channel (PUCCH) and PUSCH resources required for CSI reporting can be effectively used using such dynamic activation and deactivation operations.

In addition, periodic channel state information of NR may not support the above-mentioned subband reporting (subband CQI or subband PMI). In the case of the PUCCH used in the periodic CSI reporting, the amount of reporting that can be transmitted is limited. Accordingly, in LTE, the UE itself may select and report channel state information for some subbands in consideration of the limited amount of transmittable reporting. However, since the reporting of these selective subbands includes extremely limited information, the usefulness of the corresponding information is not significant. Therefore, NR does not support such reporting, thereby reducing the complexity of the UE and increasing the efficiency of the reporting.

As described above, in NR, two types of CSI reporting having low spatial resolution and high spatial resolution are supported as follows. The following Table 7 to Table 10 show two types of CSI reporting and reporting overhead required for each reporting type. Specifically, Table 7 below is a table describing type 1 CSI reporting.

TABLE 7

In a case of two antenna ports, NR supports the following type 1 codebook.

$$W \in \left\{ \frac{1}{\sqrt{2}} \begin{bmatrix} 1 \\ e^{j\frac{\pi n}{2}} \end{bmatrix}, n = 0, 1, 2, 3 \right\} \text{ for rank} - 1 \text{ and}$$

$$\left\{ \frac{1}{2} \begin{bmatrix} 1 & 1 \\ j^n & -j^n \end{bmatrix}, n = 0, 1 \right\} \text{for rank} - 2$$

In a case of at least four antenna ports, NR supports the following channel state reporting for rank 1 to rank 8.
(1) PMI codebook assumes the precoder structure as $W = W_1 W_2$, and $W_1 =$ $$\begin{bmatrix} B & 0 \\ 0 & B \end{bmatrix},$$

1 and 2, the value of L is settable as 1 or 4, and W2 performs beam selection (this is applied only when L = 4) and indicates QPSK co-phasing between two polarizations.
(2) The following antenna port layouts ($N_1$, $N_2$) and oversampling factors ($O_1$, $O_2$) are supported.

| Number of CSI-RS ports | ($N_1$, $N_2$) | ($O_1$, $O_2$) |
|---|---|---|
| 4 | (2, 1) | (4, −) |
| 8 | (2, 2) | (4, 4) |
| | (4, 1) | (4, −) |
| 12 | (3, 2) | (4, 4) |
| | (6, 1) | (4, −) |

TABLE 7-continued

| 16 | (4, 2) | (4, 4) |
|---|---|---|
|  | (8, 1) | (4, -) |
| 24 | (6, 2), (4, 3) | (4, 4) |
|  | (12, 1) | (4, -) |
| 32 | (8, 2), (4, 4) | (4, 4) |
|  | (16, 1) | (4, -) |

Figure 22:
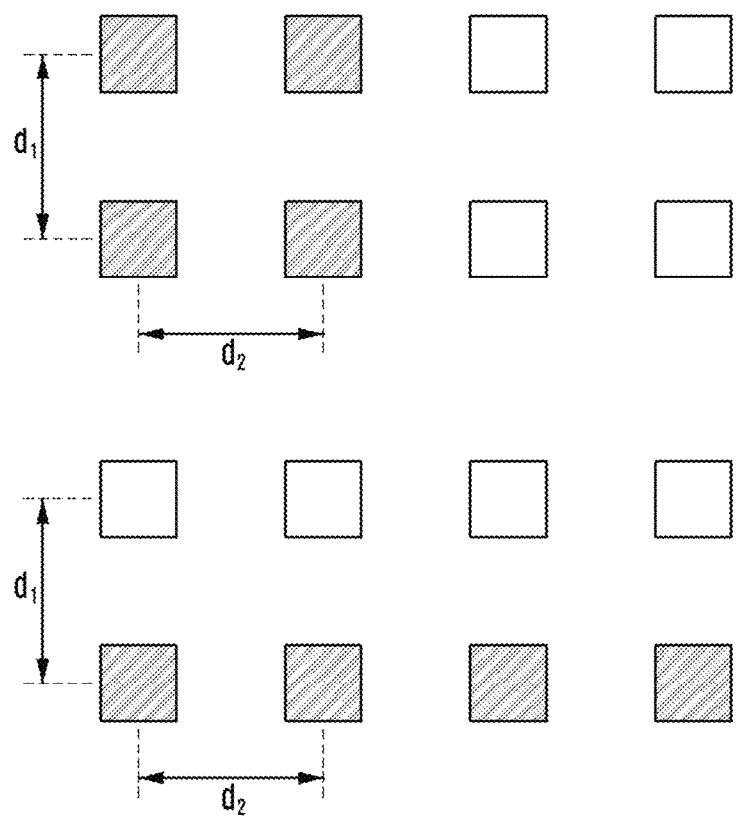
FIG. 22 illustrates an example of a beam group pattern for an antenna port layout according to an embodiment of the disclosure.

(3) In a case of L = 4, a beam group (B) pattern as shown in FIG. 22 is supported according to the value of $N_2$.
2D antenna port layout ($N_2 > 1$):
1D antenna port layout ($N_2 = 1$):

Table 8 below is a table describing type 2 CSI reporting.

TABLE 8

NR supports type 2 CSI reporting for ranks 1 and 2.
(1) PMI is used for spatial channel information feedback.
(2) PMI codebook assumes the following precoder structure for case of ranks 1 and 2.

For rank 1: $W = \begin{bmatrix} \tilde{W}_{0,0} \\ \tilde{W}_{1,0} \end{bmatrix} = W_1 W_2$, W is normalized to 1

For rank 2: $W = \begin{bmatrix} \tilde{W}_{0,0} & \tilde{W}_{0,1} \\ \tilde{W}_{1,0} & \tilde{W}_{1,1} \end{bmatrix} = W_1 W_2$, columns of W are normalized to $\frac{1}{\sqrt{2}}$ (3) $\tilde{W}_{r,l} = \Sigma_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (a combination of L beams to which weight is added)

The value of L is settable as one of 2, 3, and 4, $b_{k_1,k_2}$ denotes an oversampled 2D DFT beam, r denotes polarization and has a value of 0 or 1, and 1 denotes a layer and has a value of 0 or 1.

$p_{r,l,i}^{(WB)}$ denotes a wideband (WB) beam amplitude scaling factor for beam i, polarization r, and layer 1.

$p_{r,l,i}^{(SB)}$ denotes a subband (SB) beam amplitude scaling factor for beam i, polarization r, and layer 1.

TABLE 8-continued $c_{r,l,i}$ denotes a beam combination coefficient (phase) for beam i, polarization r, and layer 1, which is 2 bits in the case of QPSK and 3 bits in the case of 8PSK.
Amplitude scaling mode is settable by a combination of WB and SB (with non-uniform bit allocation) or by WB only.

Table 9 below describes reporting overhead for type 1 CSI reporting.

TABLE 9

| Number of CSI-RS ports | ($N_1$, $N_2$) | ($o_1$, $o_2$) | i1 Payload (L = 1) | i1 Payload (L = 4) | i2 payload |
|---|---|---|---|---|---|
| 4 | (2, 1) | (4, -) | 3 bits | 2 bits | For rank1, |
| 8 | (2, 2) | (4, 4) | 6 bits | 4 bits | 2 bits for L = 1, |
|  | (4, 1) | (4, -) | 4 bits | 3 bits | 4 bits for L = 4 |
| 12 | (3, 2) | (4, 4) | 7 bits | 5 bits | For rank2, |
|  | (6, 1) | (4, -) | 4 bits | 3 bits | Additional 2 |
| 16 | (4, 2) | (4, 4) | 7 bits | 5 bits | bits |
|  | (8, 1) | (4, -) | 5 bits | 4 bits | for i1, |
| 24 | (6, 2), (4, 3) | (4, 4) | 8 bits | 6 bits | 1 bits for L = 1, |
|  | (12, 1) | (4, -) | 6 bits | 5 bits | 3 bits for L = 4 |
| 32 | (8, 2), (4, 4) | (4, 4) | 8 bits | 6 bits |  |
|  | (16, 1) | (4, -) | 6 bits | 5 bits |  |

Table 10 below describes reporting overhead for type 2 CSI reporting. In particular, in Table 10, an example in which, for a combination of amplitudes of a WB and a SB, ($N_1$, $N_2$)=(4, 4), Z=3(8 PSK), and K leading coefficients correspond to 4, 4, and 6 when L=2, 3, 4 is described.

TABLE 10

| L (*) | Rotation [$\log_2(O_1 O_2)$] | L-beam selection (**) | Strongest coefficient (1 out of 2L): [$\log_2 2L$] per layer | WB amp: 3 × (2L − 1) per layer | Total WB payload | SB phase (1 SB): 1 × (K − 1) per layer | SB phase (1 SB): Z × (K − 1) + 2 × (2L − K) per layer | Total payload (WB + 10 SBs) |
|---|---|---|---|---|---|---|---|---|
| Rank 1 payload (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| Rank 2 payload (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 6 | 42 | 63 | 10 | 38 | 543 |

As described above, the type 1 CSI reporting may provide the channel state to the base station through RI, PMI, CQI, CRI, etc., based on the codebook as in the existing LTE. On the other hand, the type 2 CSI reporting provides a higher level of resolution through greater PMI reporting overhead to an implicit CSI similar to type 1 CSI reporting, and this PMI reporting is generated through a linear combination through which up to four orthogonal beams are multiplied by phase and amplitude, and the resultant values are added.

Figure 8:
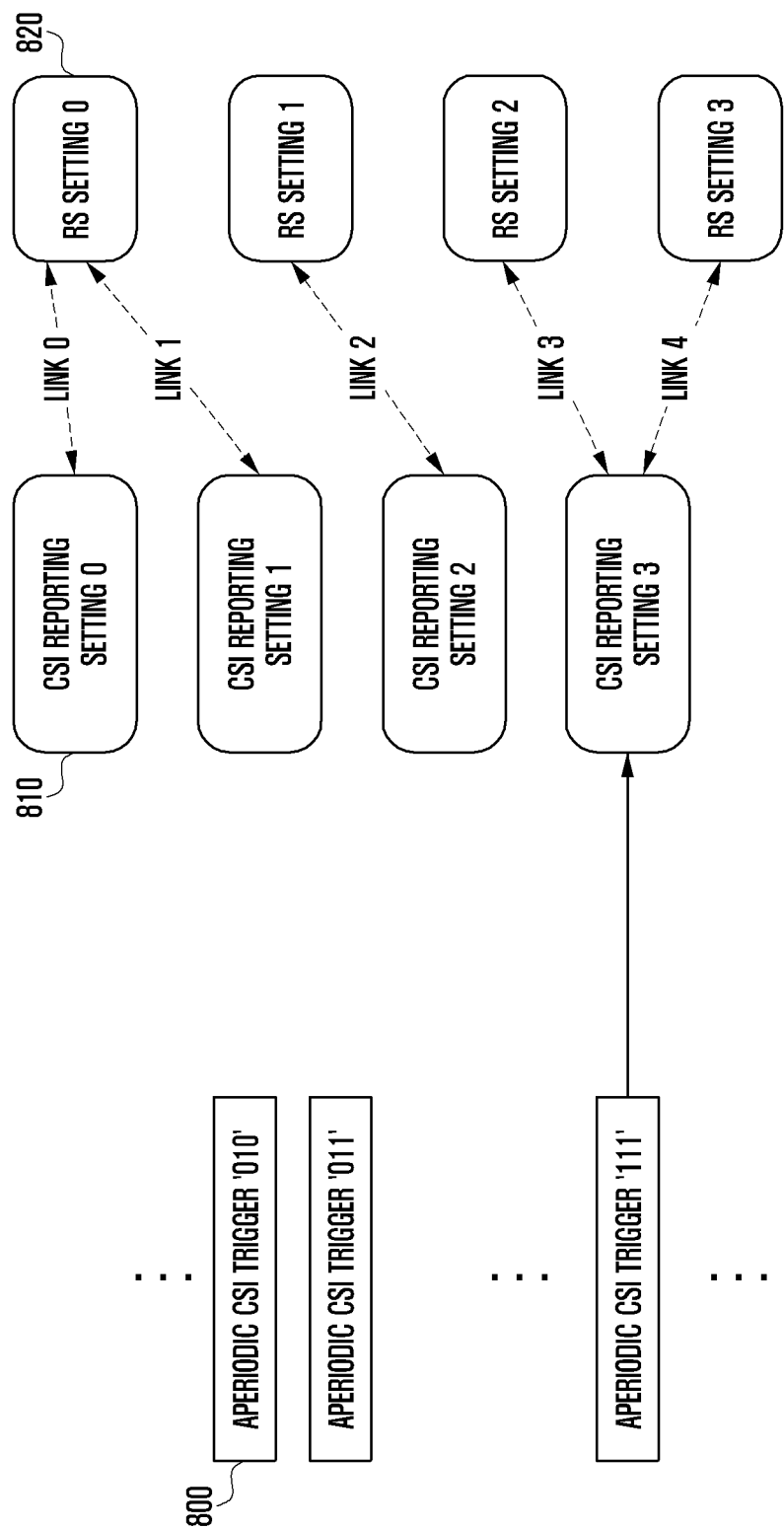
FIG. 8 illustrates a method for performing aperiodic channel state reporting by triggering channel state reporting setting within trigger setting.

Referring to FIG. 8, a base station may pre-configure CSI reporting setting 810, which is triggered for each trigger field 800, by using RRC, in order to perform aperiodic CSI reporting. Here, the base station may directly configure a CSI reporting setting ID in trigger configuration in order to configure the triggered CSI reporting setting. Table 11 below shows RRC information indicating CSI reporting setting for aperiodic CSI reporting trigger.

Table 11

TABLE 11

```
-- ASN1START
-- TAG-CSI-APERIODICTRIGGERSTATELIST-START
CSI-AperiodicTriggerStateList ::=    SEQUENCE(SIZE(1..maxNrOfCSI-AperiodicTriggers)) OF
CSI-AperiodicTriggerState
CSI-AperiodicTriggerState ::=        SEQUENCE {
    associatedReportConfigInfoList   SEQUENCE
(SIZE(1..maxNrofReportConfigPerAperiodicTrigger)) OF CSI-AssociatedReportConfigInfo,
    ...
}
CSI-AssociatedReportConfigInfo::=    SEQUENCE {
    reportConfigId                   CSI-ReportConfigId,
    resourcesForChannel              CHOICE {
        nzp-CSI-RS                   SEQUENCE {
            resourceSet              INTEGER
(1..maxNrofNZP-CSI-RS-ResourceSetsPerConfig),
            qcl-info                 SEQUENCE
(SIZE(1..maxNrofAP-CSI-RS-ResourcesPerSet)) OF TCI-StateId
        },
        csi-SSB-ResourceSet          INTEGER
(1..maxNrofCSI-SSB-ResourceSetsPerConfig)
    },
    csi-IM-ResourcesforInteference   INTEGER(1..maxNrofCSI-IM-ResourceSetsPerConfig)
        OPTIONAL, -- Cond CSI-IM-forInterference
    nzp-CSI-RS-ResourcesforInterferenceINTEGER (1..maxNrofNZP-CSI-RS-ResourceSetsPerConfig)
        OPTIONAL; -- Cond NZP-CSI-RS-forInterference
    ...
}
-- TAG-CSI-APERIODICTRIGGERSTATELIST-STOP
-- ASN1STOP
```

The UE can use the generated PMI reporting to report an eigenvector of an explicit channel measured by the UE.

As described above, since the type 2 CSI reporting requires higher reporting overhead, such reporting may not be suitable for periodic CSI reporting where the number of reportable bits is not large. On the other hand, in the case of aperiodic CSI reporting, since the corresponding CSI reporting is supported through the PUSCH which can support higher reporting overhead, the type 2 reporting requiring such higher reporting overhead can be supported only in aperiodic CSI reporting.

In addition, semi-persistent CSI reporting can support the type 2 CSI. Here, since the amount of supportable CSI reporting is small in a short PUCCH, the type 2 CSI can be transmitted using a long PUCCH and can report only the wideband element of the corresponding CSI by considering the characteristics of PUCCH.

In NR, periodic CSI reporting is performed using the offset and period configured via higher layer signaling. In a case of PUCCH, the semi-persistent CSI reporting is performed using the offset and period configured via higher layer signaling, and PUSCH-based semi-persistent CSI reporting is performed at a specific time point after the UE receives an activation message by using downlink control information (DCI).

Aperiodic CSI reporting may be triggered based on the CSI reporting setting within the CSI measurement setting. FIG. 8 illustrates an example in which CSI reporting setting within CSI measurement setting is triggered according to a trigger in accordance with the method described above.

Using such an aperiodic CSI reporting trigger, it is possible to indirectly indicate an aperiodic CSI-RS 820 for channel measurement and interference measurement.

Figure 9:
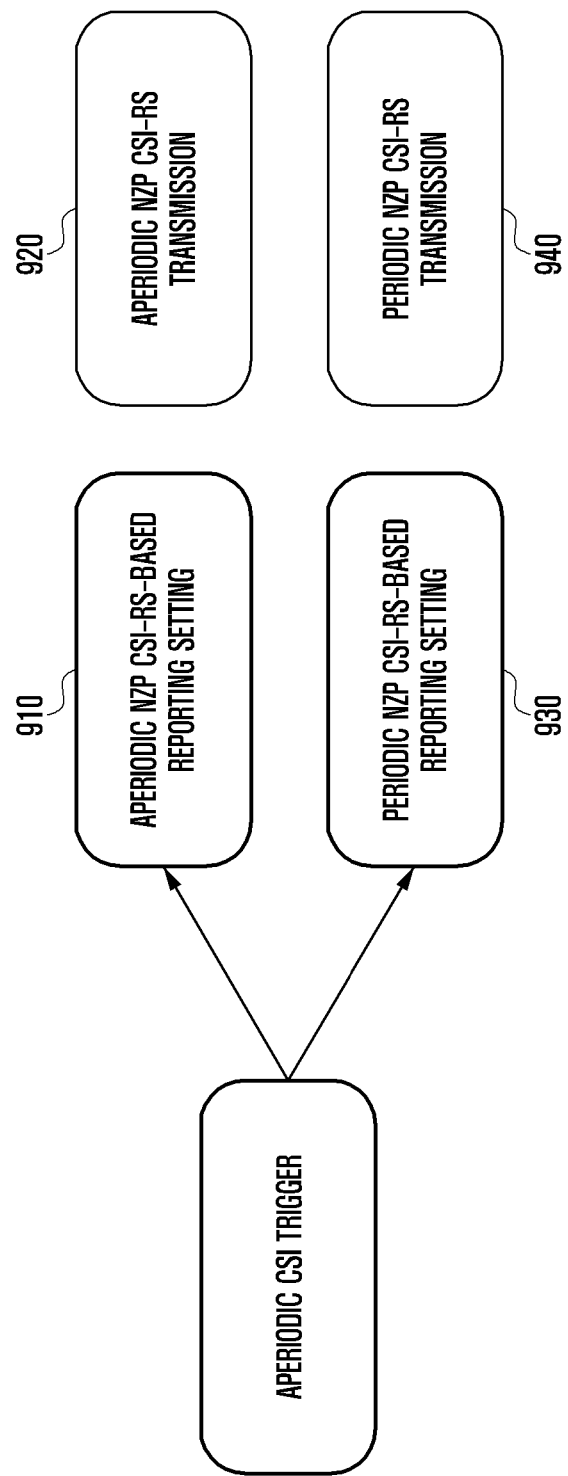
FIG. 9 illustrates an example of indirectly indicating an aperiodic CSI-RS by using an aperiodic CSI reporting indication field.

FIG. 9 illustrates an example of indirectly indicating an aperiodic CSI-RS by using an aperiodic CSI reporting indication field.

Referring to FIG. 9, a base station triggers a CSI-RS based on CSI reporting settings 910 and 930. Here, if a resource supported for channel and interference measurement in resource setting connected to the corresponding link is a periodic CSI-RS (indicated by reference numeral 920), the corresponding aperiodic channel state may be estimated based on the channel measured in the existing periodic CSI-RS resource, and if a resource supported for channel measurement in resource setting connected to the corresponding link is an aperiodic CSI-RS (indicated by reference numeral 940), the corresponding aperiodic CSI reporting may be estimated based on the channel measured at an aperiodically configured CSI-RS resource. Here, slot offset between DCI including a trigger and CSI reporting may be transmitted between the aperiodic CSI reporting trigger and the aperiodic CSI-RS, via higher layer signaling.

Here, in order to support such CSI reporting, the base station may configure resources for desired signal and interference measurement for the UE through the resource setting shown in FIG. 7. For the resource setting, the following RRC parameters may be considered. Table 12 shows CSI-RS Resource Config for the resource setting.

TABLE 12

| Parameter name | Description | Value range |
| --- | --- | --- |
| CSI-RS-ResourceConfig | CSI-RS resource configuration | |
| CSI-RS-ResourceConfigId | CSI-RS resource configuration ID | 0 . . . CSI-RS-ResourceMax - 1 |
| ResourceConfigType | Time domain behavior of resource configuration | aperiodic, semi-persistent, or periodic |
| CSI-ResourcePeriodicityAndOffset | Contains periodicity and slot offset for periodic/semi-persistent CSI-RS | |
| NrofPorts | Number of ports | 1, 2, 4, 8, 12, 16, 24, 32 |
| CSI-RS-ResourceMapping | Include parameters to capture OFDM symbol and subcarrier occupancy of the CSI-RS resource within a slot | |
| CDMType | Includes parameters to capture CDM value (1, 2, 4, or 8), CDM pattern (freq only, time and freq, time only) | |
| CSI-RS-Density | Density of CSI-RS resource measured in RE/port/PRB | e.g., ½, 1, >1 |
| CSI-RS-FreqBand | Includes parameters to enable configuration of wideband and partial band CSI-RS | |
| Pc | Power offset of NZP CSI-RS RE to PDSCH RE | |
| Pc-SS | Power offset of NZP CSI-RS RE to SS/PBCH block | |
| ScramblingID | Scrambling ID | |
| CSI-RS-ResourceRep | Configuration of CSI-RS resource repetition | |

Based on the resource setting, NR may support beam measurement, reporting, and management. Here, each field is used for the following purposes.

NZP-CSI-RS-Resource ConfigID: ID of corresponding CSI-RS resource configurations NrofPorts: Number of CSI-RS ports that corresponding CSI-RS resource includes CSI-RS-timeConfig: Transmission interval and slot offset of corresponding CSI-RS resource CSI-RS-ResourceMapping: Location of OFDM symbol in slot and location of subcarrier in PRB of corresponding CSI-RS resource CSI-RS-Density: Frequency density of corresponding CSI-RS.

CDMType: CDM length and CDM RE pattern of corresponding CSI-RS.

CSI-RS-FreqBand: Transmission bandwidth and starting location of corresponding CSI-RS Pc: Ratio between PDSCH energy per RE (EPRE) and NZP CSI-RS EPRE Pc-SS: Ratio between SS/PBCH block EPRE and NZP CSI-RS EPRE CSI-RS-ResourceRep: Setting of CSI-RS resource repetition (reception beam repetition) for determination of reception beam by UE In order to configure the CSI-RS resource, one of {1, 2, 4, 8, 12, 16, 24, and 32} in NR may be determined to be the number of CSI-RS ports, and different configured degrees of freedom are supported depending on the number of CSI-RS ports configured in the CSI-RS resource. Table 12-1 shows the density of the CSI-RS, the length and type of the CDM, the start location of the CSI-RS component RE pattern on the frequency axis and the time axis ($\bar{k}$, $\bar{l}$), and the number of REs (k') on the frequency axis and the number of REs (l') on the time axis of the CSI-RS component RE pattern, which are configurable according to the number of NR CSI-RS ports (X).

According to some embodiments, the CSI-RS component RE pattern is a basic unit configuring a CSI-RS resource, and may include a total of YZ REs including (Y=1+max (k')) REs adjacent to each other on the frequency axis, and multiplied by (Z=1+max (l')) REs adjacent to each other on the time axis. Referring to Table 12-1, the NR supports different configured degrees of freedom of the frequency axis according to the number of CSI-RS ports configured in CSI-RS resources. In a case of 1 port, the CSI-RS RE may be configured without limitation to subcarriers in a PRB and the locations of the CSI-RS REs may be designated based on a 12-bit bitmap. When there are {2, 4, 8, 12, 16, 24, and 32} ports and Y=2, the CSI-RS RE may be configured for every two subcarriers in the PRB, and the locations of the CSI-RS REs may be designated based on a 6-bit bitmap. When there are 4 ports and Y=4, the CSI-RS RE may be configured for every four subcarriers in the PRB and the locations of the CSI-RS REs may be designated based on a 3-bit bitmap. Similarly, the locations of the CSI-RS REs on the time axis may be designated based on a bitmap of a total of 14 bits. Here, a length of a bitmap may be changed according to Z value in Table 13, as the frequency position is specified, but since a principle is similar to the aforementioned descriptions, detailed descriptions thereof will be omitted.

TABLE 13

| Row w | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0),$ $(k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1),$ $(k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3, | 0, 1 | 0, 1 |
| 13 | 24 | 1, 0.5 | FD-CDM2 | $(k_0, l_0), (k_1, l_0), (k_2, l_0),$ $(k_0, l_0 + 1), (k_1, l_0 + 1),$ $(k_2, l_0 + 1), (k_0, l_1), (k_1, l_1),$ $(k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0),$ $(k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD2) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0),$ $(k_3, l_0), (k_0, l_0 + 1),$ $(k_1, l_0 + 1), (k_2, l_0 + 1),$ $(k_3, l_0 + 1), (k_0, l_1), (k_1, l_1),$ $(k_2, l_1), (k_3, l_1),$ $(k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7, | 0, 1 | 0 |
| 18 | 32 | 1, 0.5 | CDM8 (FD2, TD2) | $(k_0, l_0), (k_1, l_0), (k_2, l_0), (k_3, l_0),$ | 0, 1, 2, 3 | 0, 1 | 0, 1, 2, 3 |

Based on the CSI-RS, in NR, a tracking RS (TRS) may be configured for fine time/frequency tracking of the UE. The TRS may be referred to as another term, such as a CSI-RS for tracking in the specification/standard, but is referred to as TRS herein. The TRS may be transmitted in one (X=1) or two (X=2) consecutive slots at a particular interval such as 10 ms or 20 ms, and this may be called a TRS burst.

Figure 10A:
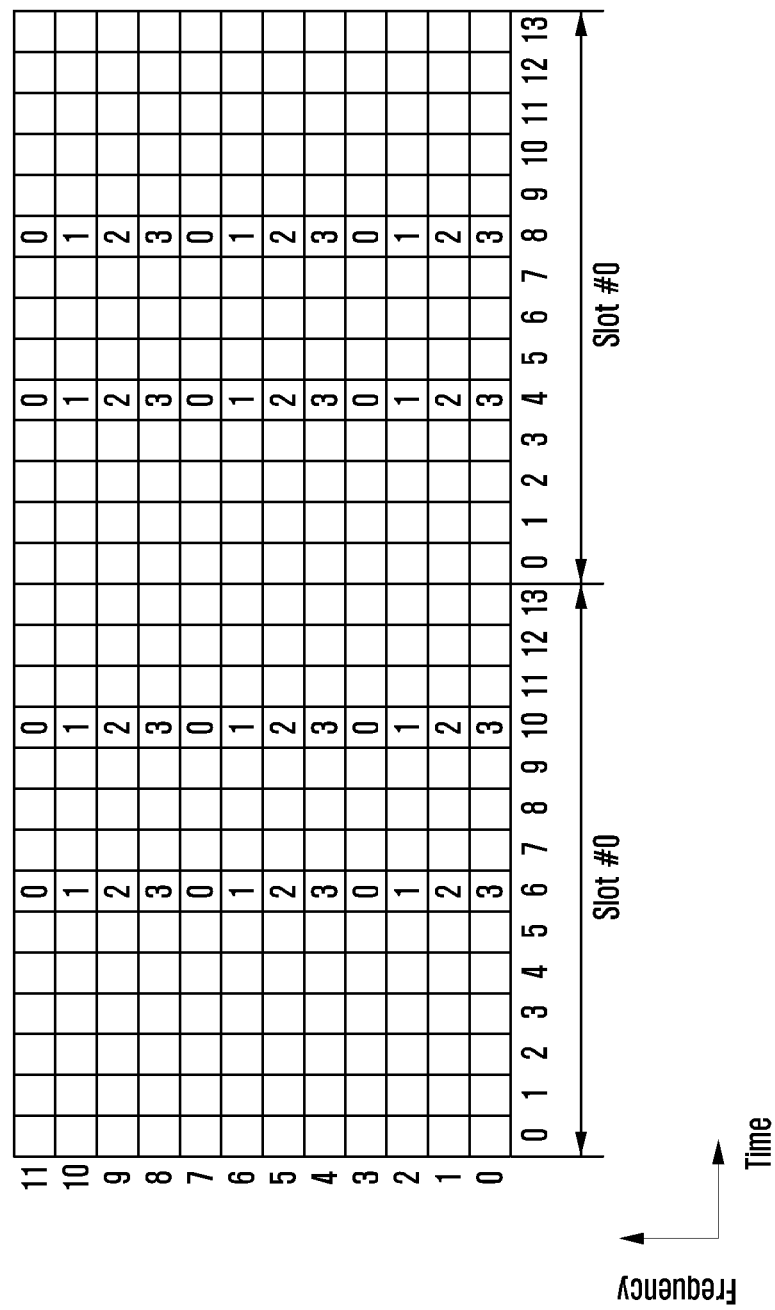
FIG. 10A illustrates an RE pattern of a TRS.
Figure 10B:
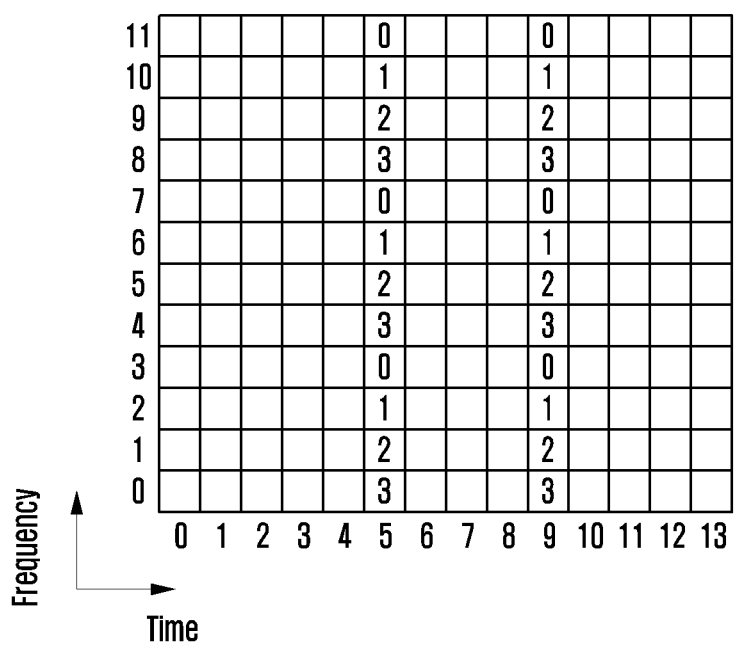
FIG. 10B illustrates another RE pattern of a TRS.

FIGS. 10A and 10B illustrate an example of an RE pattern of a TRS according to some embodiments.

FIGS. 10A and 10B illustrate examples of TRS patterns for TRS bursts of X=2 and X=1, respectively. As shown in FIGS. 10A and 10B, the TRS may have a frequency RE density of 3 RE/RB/port, and the REs may be repeated every four subcarriers (that is, one TRS port is transmitted in one of 0, 1, 2, 3 REs shown in the REs of the TRS OFDM symbol of FIG. 10A or 10B). Further, according to some embodiments, the TRS may be transmitted in one of three OFDM symbol pairs of [{5th, 9th}, {6th, 10th}, and {7th, 11th}] in the frequency band 6 GHz or below, which is referred to as frequency range 1 (FR1), and may be transmitted in one of ten OFDM symbol pairs of [{1st, 5th}, {2nd, 6th}, {3rd, 7th}, {4th, 8th}, {5th, 9th}, {6th, 10th}, {7th, 11th}, {8th, 12th}, {9th, 13th}, and {10th, 14th}] in the frequency band equal to or more than 6 GHz, which is referred to as frequency range 2 (FR2). It should be noted that the locations of OFDM symbols are examples of the TRS configuration in FIGS. 10A and 10B, and the actual transmission locations may be changed according to the transmission by the base station.

Figure 10C:
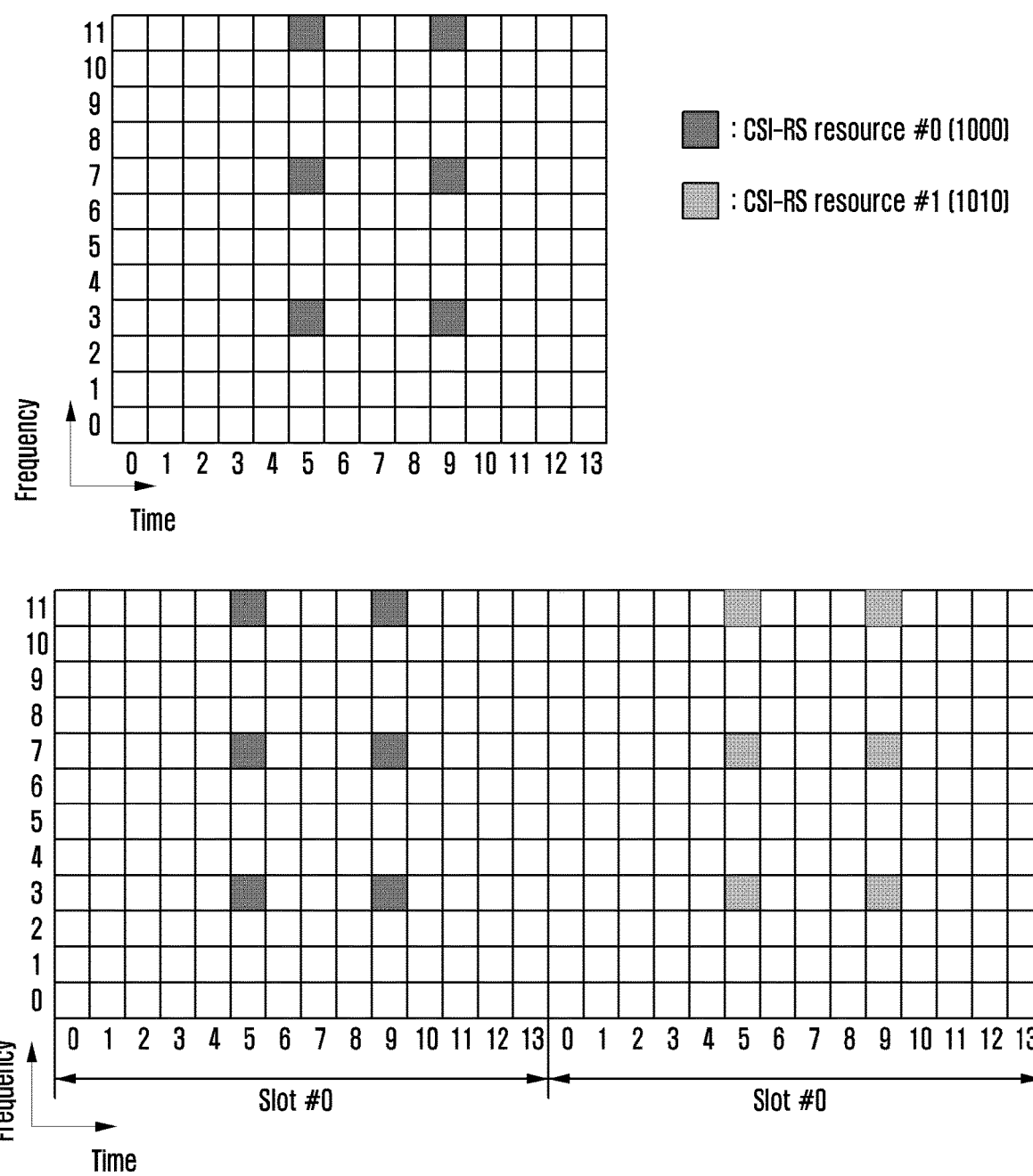
FIG. 10C illustrates 1-port CSI-RS setting.

FIG. 10C illustrates 1-Port CSI-RS setting according to some embodiments.

Referring to FIG. 10C, FIG. 10C illustrates an example of 1-port CSI-RS setting for covering the TRS RE patterns in FIGS. 10A and 10B. According to FIG. 10C, a base station may configure one resource set in one resource setting, and may configure up to two CSI-RS resources in the resource set. Here, the frequency RE density of the CSI-RS may be set to 3 RE/RB/ports.

If the TRS burst of X=1 is used, the base station may configure only CSI-RS resource #0, and if the TRS burst of X=2 is used, the base station may configure both CSI-RS resource #0 1000 and CSI-RS resource #1 1010. When the TRS burst of X=2, the base station may configure the CSI-RS-ResourceRep parameter to be "ON" and thus the UE is capable of performing continuous time/frequency tracking by assuming the same transmission beam for all 1-port CSI-RSs.

As another example, if the CSI-RS resources are configured as the TRS, for example, when there is no report setting corresponding to the CSI-RS resource (i.e., there is no report setting referring to the corresponding CSI-RS resource) or when it is explicitly configured for the UE that time/frequency tracking can be performed through the corresponding CSI-RS, it is possible to make a promise such that the UE assumes that all the CSI-RS ports belonging to the CSI-RS resources are the same antenna port regardless of the configuration of the ResourceRep parameter for each CSI-RS resource.

Figure 10D:
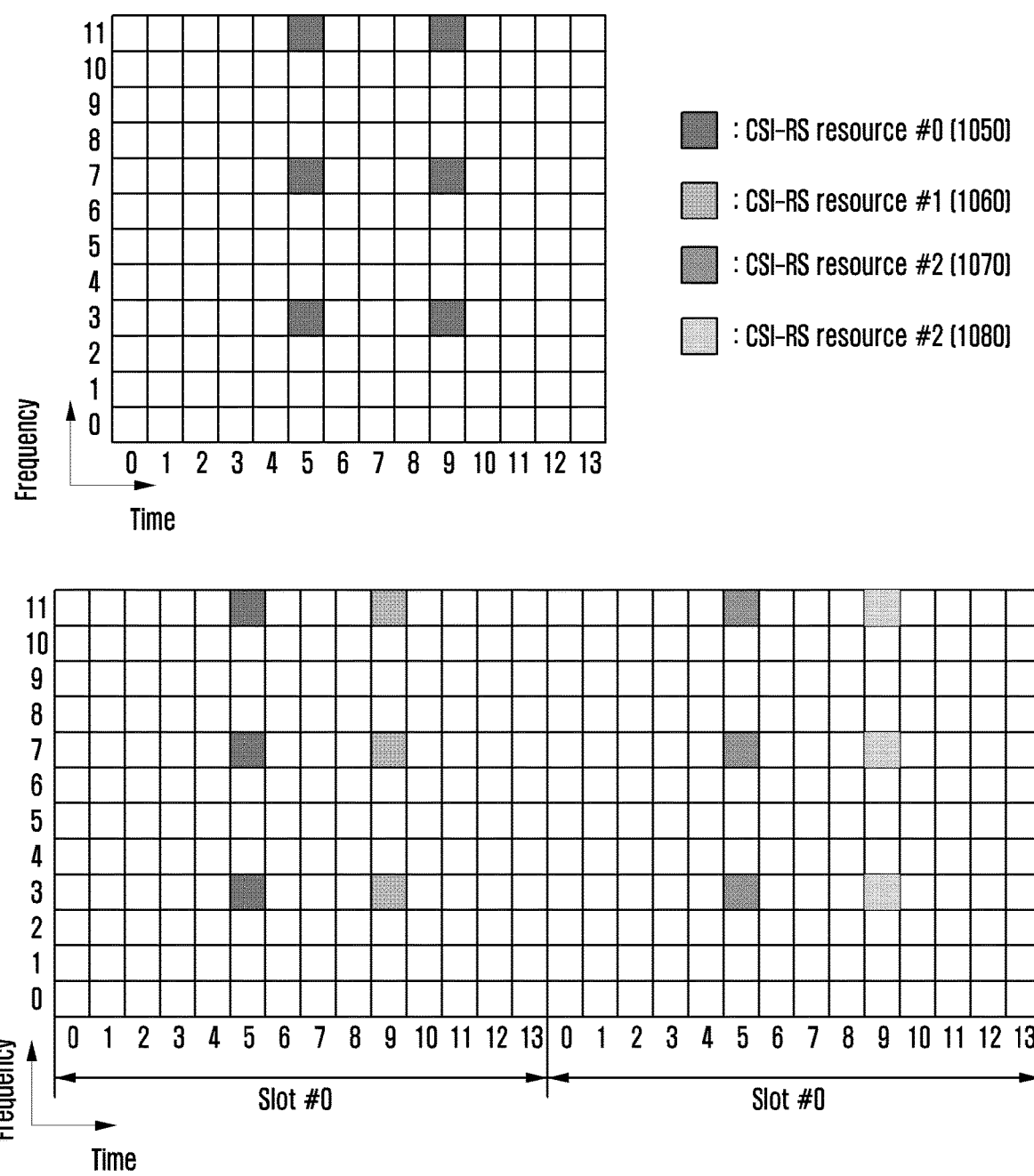
FIG. 10D illustrates another 1-port CSI-RS setting.

FIG. 10D illustrates 1-Port CSI-RS setting according to some embodiments.

Referring to FIG. 10D, FIG. 10D illustrates an example of 1-port CSI-RS setting for covering the TRS RE patterns in FIGS. 10A and 10B. According to FIG. 10D, a base station may configure one resource set in one resource setting, and may configure up to four CSI-RS resources in the resource set. Here, the frequency density of the CSI-RS may be set to 3 RE/RB/ports.

If the TRS burst of X=1 is used, the base station may configure CSI-RS resources #0 1000 and #1 1010, and if the TRS burst of X=2 is used, the base station may configure all CSI-RS resources #0 1050, #1 1060, #2 1070, and #3 1080. In a case of the TRS burst of X=1 or X=2, the base station may configure the CSI-RS-ResourceRep parameter to be "ON", and thus the UE is capable of performing continuous time/frequency tracking by assuming the same transmission beam for all 1-port CSI-RSs.

As another example, if the CSI-RS resources are configured as the TRS, for example, when there is no corresponding report setting (i.e., there is no report setting referring to the corresponding CSI-RS resource) or when it is explicitly configured for the UE that time/frequency tracking can be performed through the corresponding CSI-RS, it is possible to make a promise such that the UE assumes that all the CSI-RS ports belonging to the CSI-RS resources are the same antenna port regardless of the configuration of the ResourceRep parameter for each CSI-RS resource.

The locations of the subcarriers and the locations of the OFDM symbols of the 1-port CSI-RS resources in FIGS. 10C and 10D may be change suitably according to the locations of the TRS subcarriers in FIGS. 10A and 10B.

The TRS transmission may be performed in periodic, semi-persistent, and aperiodic types. The periodic TRS (P-TRS) is periodically transmitted before radio resource control (RRC) reconfiguration occurs according to the period and slot offset value, which are configured through RRC. The semi-persistent TRS (SP-TRS) is transmitted after activation by the MAC CE or DCI based on the period and slot offset value configured through RRC and before deactivation. The aperiodic TRS (A-TRS) is triggered and transmitted by the DCI without configuration of the period or slot offset value.

The A-TRS triggering and the A-TRS transmission timing may have an offset (between triggering and transmission timing) configured in a higher layer, or may follow a pre-promised value (for example, such that the A-TRS is to be transmitted to the same slot as that of the A-TRS triggering).

Since, for the A-TRS, it may be difficult to measure the statistical characteristics of a channel due to the insufficient number of time-axis REs, the A-TRS may be associated with the periodic TRS. The association between the A-TRS and the SP-TRS or the P-TRS may be supported by various methods such as quasi co-location (QCL). For example, the base station may configure at least one SP-TRS or P-TRS in the A-TRS as a QCL reference RS, so as to extract channel statistic values, such as delay spread, average delay, Doppler spread, Doppler shift, and the like (QCL type A) or extract spatial parameters, such as transmission (TX) beam (this can be understood as signal transmission using a specific spatial domain transmission filter) and a reception (RX) beam (this can be understood as signal reception using a specific spatial domain receiver filter) (QCL type D).

NR MIMO supports a large number of antennas and transmission and reception in a high frequency band such as 28 GHz. Wireless communication using such a millimeter-wave experiences high linearity and high path loss due to the characteristics of the corresponding band, and in order to overcome this, hybrid beamforming obtained by combining analog beamforming based on RF and antenna phase shifting and digital beamforming based on digital precoding are required.

Figure 11:
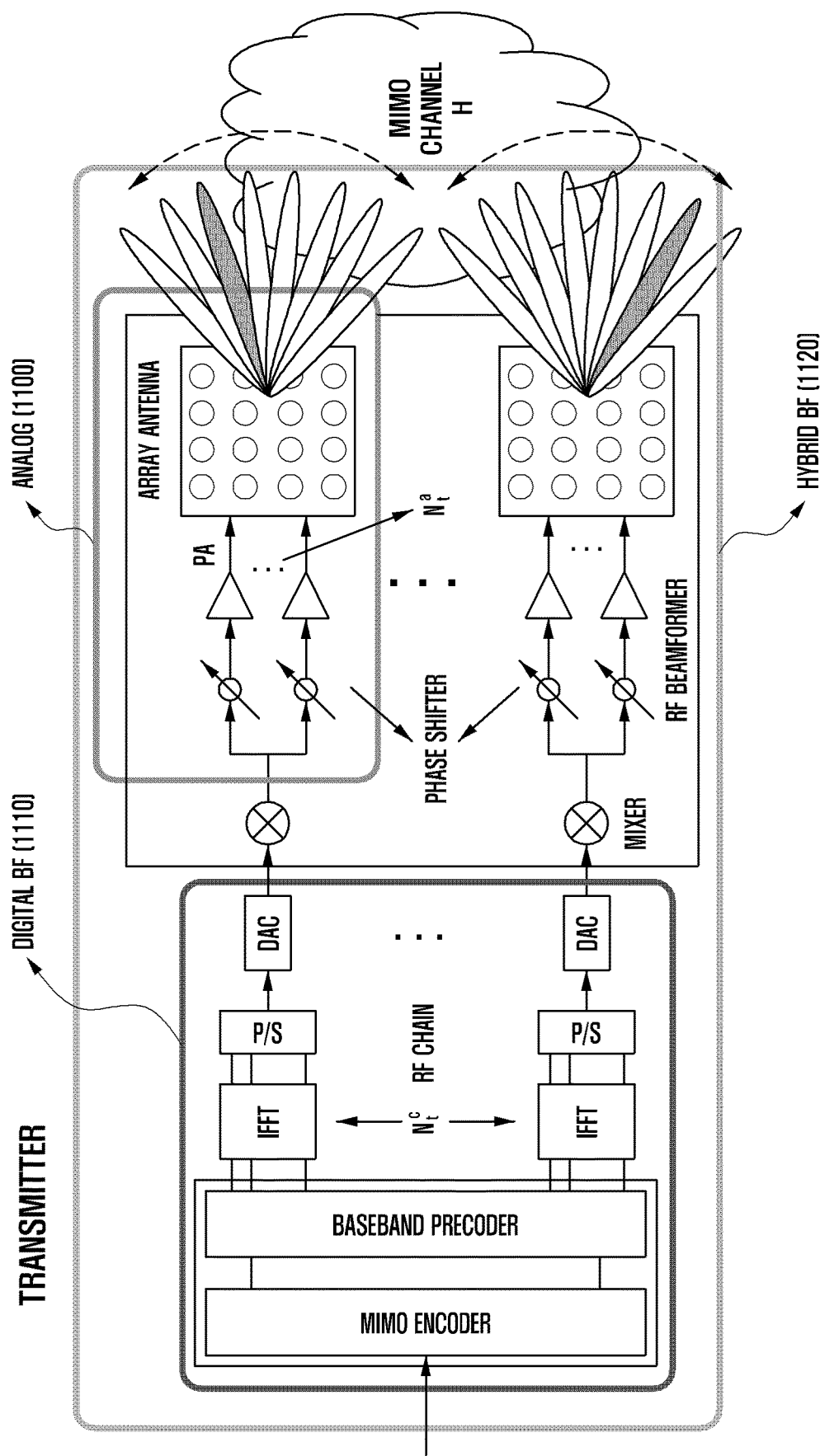
FIG. 11 illustrates an example of indirectly indicating an aperiodic interference measurement resource by using an aperiodic channel state reporting indication field.

FIG. 11 illustrates such a hybrid beamforming system.

Referring to FIG. 11, a base station and a UE include an RF chain and a phase shifter for digital beamforming 1110 and analog beamforming 1100, respectively. Analog beamforming 1000 on a transmission side is a method for changing the phases of signals transmitted from a plurality of antennas, through the phase shifter, thereby concentrating the corresponding signal in a specific direction when the signals are transmitted using a plurality of antennas. To this end, an array antenna, which is a collection of a plurality of antenna elements, is used. The use of such transmission beamforming can increase the propagation distance of the corresponding signal, and since signals are hardly transmitted in directions other than the corresponding direction, interference to other users is considerably reduced. Similarly, a reception side may perform reception beamforming by using reception array antenna, and thus the sensitivity of signals entering in a corresponding direction can be increased by concentrating the reception of radio waves in a specific direction, and an interference signal can be blocked by excluding signals entering in directions other than the corresponding direction from the reception signal.

Meanwhile, a required separation distance between antennas is proportional to the wavelength of a transmission frequency (e.g., may be a half wavelength interval). Therefore, as the transmission frequency is higher, the wavelength of the radio waves becomes shorter, and thus the array antenna may be configured by more element antennas in the same area. Considering this aspect, a communication system operating in a high frequency band is advantageous for applying a beamforming technique thereto because a relatively higher antenna gain can be obtained compared to a case of using a beamforming technique in a low frequency band.

In this beamforming technique, in order to obtain a higher antenna gain, hybrid beamforming 1120 combining digital precoding 1110 used for obtaining a high data rate effect in the conventional multi-antenna system is used in addition to application of the analog beamforming technique. Here, when the beam is formed via analog beamforming and one or more analog beams are formed, digital precoding similar to that applied in the conventional multiple antennas is applied to the baseband and transmitted, and thus more reliable signal reception and higher system capacity can be expected.

Figure 12:
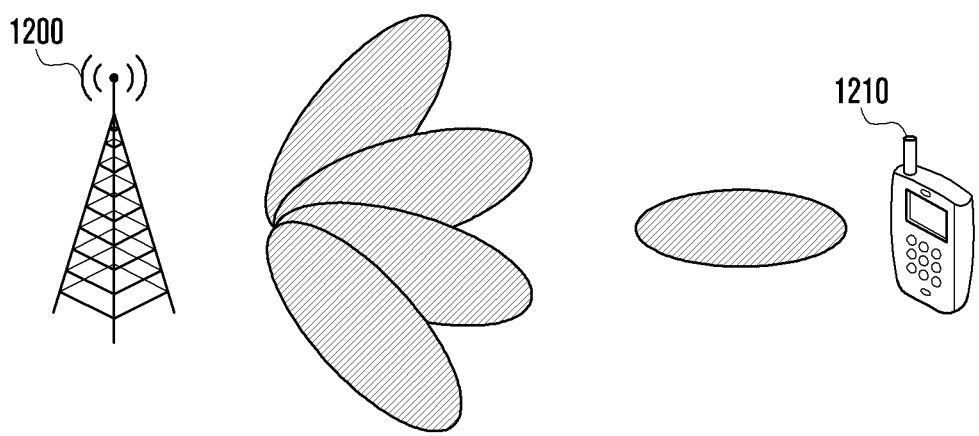
FIG. 12 illustrates an example of reference signal transmission required for a beam sweeping operation of a base station.
Figure 13:
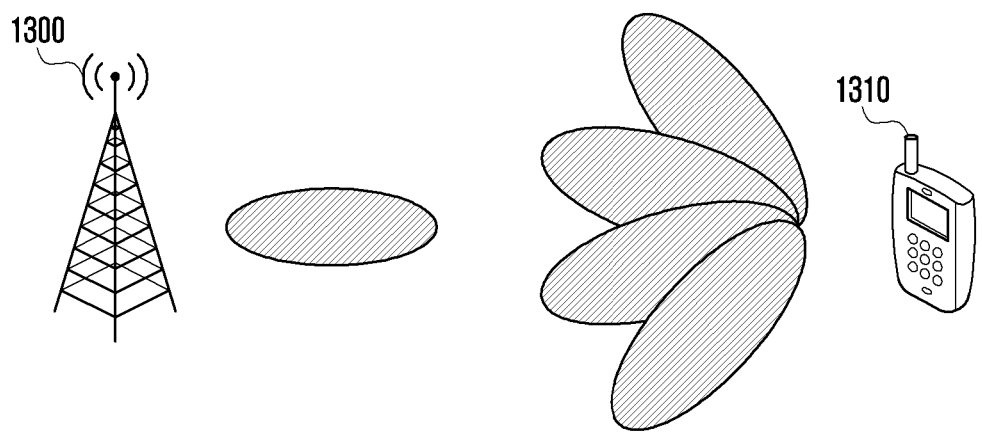
FIG. 13 illustrates an example of a transmission beam sweeping operation of a base station.
Figure 14:
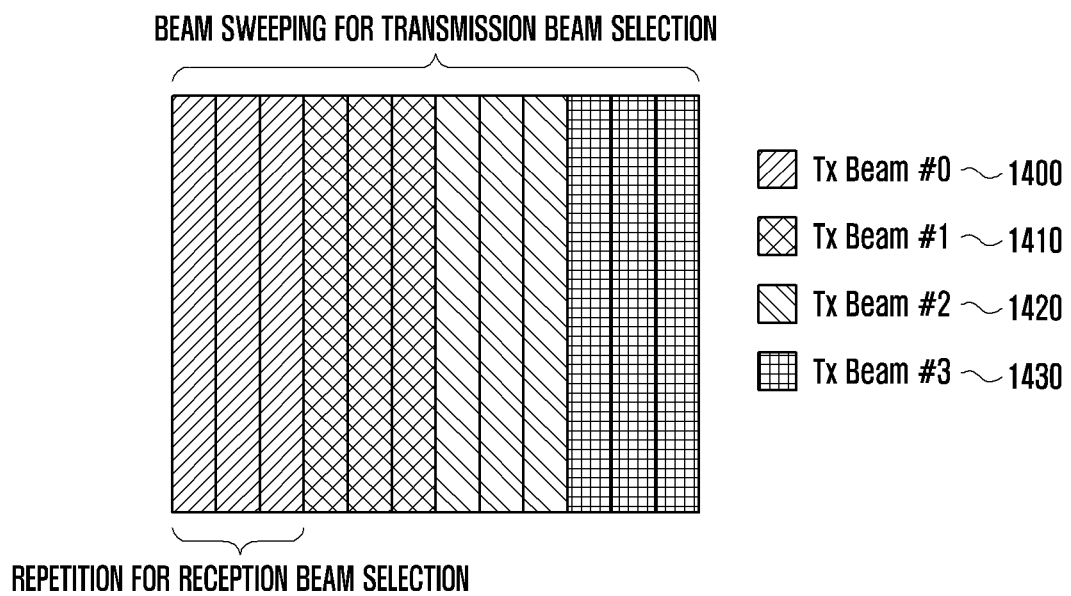
FIG. 14 illustrates an example of a reception beam sweeping operation of a UE.

In applying the beamforming, it is most important to select an optimized beam direction for the base station and the UE. In order to select the optimized beam direction, the base station and the UE may support beam sweeping by using a plurality of time and frequency resources. FIGS. 12, 13, and 14 illustrate the beam sweeping operation of a UE and a base station.

FIG. 12 illustrates an example of a beam sweeping operation of a base station. Referring to FIG. 12, a base station 1200 transmits a plurality of transmission beams to a UE 1210 in order for the base station to select transmission beam. Based on this, the UE may determine an optimal beam suitable for data transmission to the UE and may inform of the determined optimal beam to the base station. FIG. 13 illustrates an example of a beam sweeping operation of a UE. Referring to FIG. 13, a base station 1300 may repeatedly transmit the same beam in order for the UE to select reception beam, and a UE 1310 may determine the reception beam of the corresponding UE for each beam based on the repeated transmission and may inform of the determined reception beam to the base station or may use the reception beam of the UE, determined according to a base station transmission beam indicated by the base station.

FIG. 14 illustrates an example of reference signal transmission for a transmission beam selection operation of the base station and a reception beam selection operation of the UE which are shown in FIGS. 12 and 13. Referring to FIG. 14, a UE or a base station transmits a reference signal by using a different beam to a time resource for beam selection of the UE or the base station. Here, the base station or the UE, having received the reference signal, may measure the quality of the reference signal based on the CQI and reference signals received power (RSRP) of the reference signal, and may select one or a plurality of transmission or reception beams according to the corresponding results. Although FIG. 14 shows transmission of the reference signal based on different beams through different time resources, it may be equally applied to frequency, cyclic shift, and code resources. Here, as shown in FIG. 14, the base station or the UE may transmit a plurality of transmission beams (transmission beam #0 to #3) 1400, 1410, 1420, and 1430 for the transmission beam sweeping, and may repeatedly apply and transmit one transmission beam for the reception beam sweeping.

A beam management operation such as beam sweeping may also be performed based on the CSI reporting framework (resource setting, CSI reporting setting, CSI measurement setting, link, etc.) described in FIG. 7 to FIG. 9, and the periodic, semi-persistent, and aperiodic CSI-RS transmission, CSI reporting, and beam reporting.

In supporting the CSI reporting or the beam reporting, NR may configure a plurality of CSI-RS resources in a CSI-RS resource set for the transmission of a plurality of beams for transmission beam sweeping and the repeated transmission of one transmission beam for reception beam sweeping at the time of resource setting, and may configure whether the CSI-RS resources are individual CSI-RS resources or whether the same CSI-RS resource is repeated. To this end, RRC configuration parameters of Table 14 below may be provided. Table 14 shows parameters within CSI-RS Resource Set Config for the CSI-RS resource set configuration.

TABLE 14

| Parameter name | Description | Value range |
| --- | --- | --- |
| Nzp-CSI-ResourceSetId | NZP CSI-RS Resource Set ID | |
| Nzp-CSI-RS-Resources | Configuration of NZP CSI-RS Resources in the Resource Set | SEQUENCE (SIZE (1 . . . maxNrofNZP-CSI-RS-ResourcesPerSet)) OF NZP-CSI-RS-ResourceId |
| repetition | Configuration of repetition | {on, off} |
| aperiodicTriggeringOffset | Aperiodic NZP CSI-RS offset | 0, . . . , 4 |
| trs-Info | Usage for TRS | |

As shown in the configuration of Table 14, a plurality of NZP CSI-RS resources may be configured through Nzp-CSI-RS resources for a resource set, and whether the plurality of NZP CSI-RS resources are used as tracking RS (TRS) for each CSI-RS resource set (trs-info) may be configured. In a case of aperiodic CSI-RS, slot offset for the corresponding transmission may be configured through aperiodicTriggeringOffset. In addition, the CSI-RS resource repetition may be configured. Accordingly, when the UE generates channel state information or beam information by measuring the CSI-RS resources configured in a corresponding CSI-RS resource set, the CSI-RS resource repetition may allow configuration of whether individual CSI-RS resources are assumed to be transmitted based on different beams for the base station transmission beam sweeping (that is, it is assumed that individual NZP CSI-RS resources use different spatial domain transmission filters) or whether individual CSI-RS resources are assumed to be transmitted based on the same beam for the UE reception beam sweeping (that is, it is assumed that all NZP CSI-RS resources use the same spatial domain transmission filter).

Here, in the configuration of the CSI-RS resource repetition in the corresponding CSI-RS resource set configuration, only 1-port CSI-RS or 1-port or 2-port CSI-RS resources may be configured for each CSI-RS resource. In performing the transmission beam sweeping and the reception beam sweeping described in FIG. 13, the number of transmission beams may be large, such as 128 transmission beams, and the number thereof may become larger when considering reception beam sweeping. Therefore, the number of the antenna ports may be limited to a maximum 1 port or 2 ports in order to configure the CSI-RS resources required for the corresponding sweeping, and thus the overhead required for the reference signal transmission may be reduced and efficient beam management may be supported.

In addition, when the periods of NrofPorts and CSI-ResourcePeriodicity AndOffset are configured at the time of repetition of the CSI-RS resource, other configurations may not be allowed or may be disregarded. This is because it is difficult for the UE to use the CSI-RS in the same OFDM symbol to measure the quality of another reception beam at the time of sweeping a plurality of reception beams of the UE.

In addition, when the CSI-RS resource is repeated, other configurations except for CSI-RS-ResourceMapping configuration, that is, ResourceConfigType, CSI-RS-timeConfig, NrofPorts, CDMType, CSI-RS-Density, CSI-RS-FreqBand, Pc, ScramblingID, and the like, may not be allowed for a different configuration for each CSI-RS resource or the UE may disregard the corresponding configuration when the CSI-RS resources are configured differently. This is because, in a case where the UE sweeps a plurality of reception beams of the UE, if the densities of the CSI-RSs are different, a relative comparison of RSRP and CQIs for the corresponding beam measurements may be difficult. In addition, in a case where transmission at a specific CSI-RS resource occurs frequently while transmission occurs relatively infrequently at a different resource due to different periods, the reception beam sweeping required by the UE is difficult to be completely performed. Further, when Pc which is a boosting value of corresponding CSI-RS power or CSI-RS-FreqBand that is a transmission frequency band are configured differently for the same beam transmission, the RSRP for each reception beam becomes different, and even if the UE corrects the RSRP, the accuracy may be lowered. Therefore, at the time of CSI-RS resource repetition for the corresponding reception beam sweeping, in order to reduce the hardware implementation complexity of the UE in the CSI-RS repetition configuration and to efficiently perform the reception beam sweeping operation of the UE, the configuration of the CSI-RS resources included in the corresponding CSI-RS resource set may be limited.

For the operation of the beam-based wireless communication system, a transmission configuration indicator (TCI) state may be set in order to provide beam information required for transmission of a control channel, data, and a reference signal. Table 15 shows the TCI state settings of the RRC.

TABLE 15

```
-- ASN1START
-- TAG-TCI-STATE-START
TCI-State ::=                SEQUENCE {
   tci-StateId                    TCI-StateId,
   qcl-Type1                      QCL-Info,
   qcl-Type2                      QCL-Info
                                  OPTIONAL, -- Need R
   ...
}
QCL-Info ::=                 SEQUENCE {
   cell                           ServCellIndex
                                  OPTIONAL, -- Need R
   bwp-Id                         BWP-Id
                                  OPTIONAL, -- Cond CSI-RS-Indicated
```

TABLE 15-continued

```
   referenceSignal              CHOICE {
      csi-rs                           NZP-CSI-RS-ResourceId,
      ssb                              SSB-Index
   },
   qcl-Type                     ENUMERATED {typeA, typeB,
   typeC, typeD},
   ...
}
-- TAG-TCI-STATE-STOP
-- ASN1STOP
```

As shown in Table 15 above, it is possible to set CSI-RS or SSB for referring corresponding beam information (for example, QCL Type-D) at the time of setting each TCI state, and thus the UE can receive the control channel, data, and reference signal in which the corresponding TCI state is set, by using the beam information acquired through the CSI-RS or SSB transmitted in advance. Up to 64 TCI states may be set, and are divided and separately used by the control channel, data, and reference signal. Tables 16, 17, and 18 show TCI state settings for the beam information setting of the control channel, data, and reference signal, respectively.

TABLE 16

```
-- ASN1START
-- TAG-CONTROLRESOURCESET-START
ControlResourceSet ::=                  SEQUENCE {
      controlResourceSetId                    ControlResourceSetId,
      frequencyDomainResources                BIT STRING (SIZE (45)),
      duration                                INTEGER (1..maxCoReSetDuration),
      cce-REG-MappingType                     CHOICE {
         interleaved                             SEQUENCE {
            reg-BundleSize                          ENUMERATED {n2, n3, n6},
            interleaverSize                         ENUMERATED {n2, n3, n6},
            shiftIndex
            INTEGER(0..maxNrofPhysicalResourceBlocks-1)                OPTIONAL -- Need
S
         },
         nonInterleaved                          NULL
      },
      precoderGranularity                     ENUMERATED {sameAsREG-bundle,
allContiguousRBs},
      tci-StatesPDCCH-ToAddList               SEQUENCE(SIZE (1..maxNrofTCI-
StatesPDCCH)) OF TCI-StateId            OPTIONAL,   -- Need N
         tci-StatesPDCCH-ToReleaseList        SEQUENCE(SIZE (1..maxNrofTCI-
StatesPDCCH)) OF TCI-StateId            OPTIONAL,   -- Need N
   tci-PresentInDCI                        ENUMERATED {enabled}
                     OPTIONAL,  -- Need S
      pdcch-DMRS-ScramblingID                 INTEGER (0..65535)
                                  OPTIONAL,  -- Need S
      ...
}
-- TAG-CONTROLRESOURCESET-STOP
-- ASN1STOP
```

TABLE 17

```
-- ASN1START
-- TAG-PDSCH-CONFIG-START
PDSCH-Config ::=             SEQUENCE {
   dataScramblingIdentityPDSCH        INTEGER (0..1023)
                     OPTIONAL,
   dmrs-DownlinkForPDSCH-MappingTypeA      SetupRelease { DMRS-DownlinkConfig }
                     OPTIONAL,   -- Need M
   dmrs-DownlinkForPDSCH-MappingTypeB      SetupRelease { DMRS-DownlinkConfig }
                     OPTIONAL,   -- Need M
   tci-StatesToAddModList              SEQUENCE (SIZE(1..maxNrofTCI-States)) OF
TCI-State              OPTIONAL,   -- Need N
   tci-StatesToReleaseList             SEQUENCE (SIZE(1..maxNrofTCI-States)) OF TCI-
StateId                OPTIONAL,   -- Need N
```

TABLE 17-continued

```
    vrb-ToPRB-Interleaver          ENUMERATED {n2, n4}
            OPTIONAL,      -- Need S
    resourceAllocation             ENUMERATED { resourceAllocationType0,
resourceAllocationType1, dynamicSwitch},
    pdsch-TimeDomainAllocationList     SetupRelease { PDSCH-
TimeDomainResourceAllocationList }           OPTIONAL,   -- Need M
    pdsch-AggregationFactor            ENUMERATED { n2, n4, n8 }
            OPTIONAL,      -- Need S
    rateMatchPatternToAddModList           SEQUENCE (SIZE
(1..maxNrofRateMatchPatterns)) OF RateMatchPattern    OPTIONAL,    -- Need N
    rateMatchPatternToReleaseList      SEQUENCE (SIZE(1..maxNrofRateMatchPatterns))
OF RateMatchPatternId    OPTIONAL,    -- Need N
    rateMatchPatternGroup1                 RateMatchPatternGroup    OPTIONAL,  --
Need R
    rateMatchPatternGroup2                 RateMatchPatternGroup    OPTIONAL,  --
Need R
    rbg-Size                   ENUMERATED {config1, config2},
    mcs-Table                  ENUMERATED {qam256, spare1}
            OPTIONAL,      -- Need S
    maxNrofCodeWordsScheduledByDCI            ENUMERATED {n1, n2)
            OPTIONAL,      -- Need R
    prb-BundlingType               CHOICE {
    staticBundling                 SEQUENCE {
      bundleSize                   ENUMERATED { n4, wideband }
            OPTIONAL       -- Need S
    },
    dynamicBundling                SEQUENCE {
      bundleSizeSet1                   ENUMERATED { n4, wideband, n2-wideband,
n4-wideband }    OPTIONAL,     -- Need S
      bundleSizeSet2                   ENUMERATED { n4, wideband }
            OPTIONAL       -- Need S
    }
    },
    zp-CSI-RS-ResourceToAddModList             SEQUENCE (SIZE (1..maxNrofZP-
CSI-RS-Resources)) OF ZP-CSI-RS-Resource       OPTIONAL, -- Need N
    zp-CSI-RS-ResourceToReleaseList            SEQUENCE (SIZE (1..maxNrofZP-CSI-
RS-Resources)) OF ZP-CSI-RS-ResourceId        OPTIONAL -- Need N
    aperiodic-ZP-CSI-RS-ResourceSetsToAddModList       SEQUENCE (SIZE(1..max.NrofZP-
CSI-RS-ResourceSets)) OF ZP-CSI-RS-ResourceSet    OPTIONAL -- Need N
    aperiodic-ZP-CSI-RS-ResourceSetsToReleaseList    SEQUENCE (SIZE (1..maxNrofZP-CSI-
RS-ResourceSets)) OF ZP-CSI-RS-ResourceSetId OPTIONAL,
                   -- Need N
    sp-ZP-CSI-RS-ResourceSetsToAddModList    SEQUENCE (SIZE (1..maxNrofZP-CSI-RS-
ResourceSets)) OF ZP-CSI-RS-ResourceSet         OPTIONAL,   -- Need N
    sp-ZP-CSI-RS-ResourceSetsToReleaseListSEQUENCE (SIZE (1..maxNrofDP-CSI-RS-
ResourceSets)) OF ZP-CSI-RS-ResourceSetId    OPTIONAL, -- Need N
    p-ZP-CSI-RS-ResourceSet            SetupRelease { ZP-CSI-RS-ResourceSet }
            OPTIONAL, -- Need M
    ...
}
RateMatchPatternGroup ::=    SEQUENCE (SIZE
(1..maxNrofRateMatchPatternsPerGroup))OF CHOICE {    cellLevel
    RateMatchPatternId,
    bwpLevel              RateMatchPatternId
}
-- TAG-PDSCH-CONFIG-STOP
-- ASN1STOP
```

TABLE 18

```
-- ASN1START
-- TAG-NZP-CSI-RS-RESOURCE-START
NZP-CSI-RS-Resource ::=            SEQUENCE {
  nzp-CSI-RS-ResourceId            NZP-CSI-RS-ResourceId,
  resourceMapping                  CSI-RS-ResourceMapping,
  powerControlOffset               INTEGER(-8..15),
  powerControlOffsetSS             ENUMERATED {db-3, db0,
  db3, db6}
  OPTIONAL,      -- Need R
  scramblingID                     ScramblingId,
  periodicityAndOffset             CSI-ResourcePeriodicityAndOffset
  OPTIONAL,   -- CondPeriodicOrSemiPersistent
  qcl-InfoPeriodicCSI-RS           TCI-StateId
  OPTIONAL,   -- Cond Periodic
  ...
}
-- TAG-NZP-CSI-RS-RESOURCE-STOP
-- ASN1STOP
```

In order to cover the entire coverage of one cell in the mmWave band, it is necessary to cover about 120 degrees horizontally and 27 degrees vertically through the beam. An operation of covering the entire coverage may be supported through about 64 beams. However, in the case of the current TCI state, up to 64 beams may be set, but as shown in Tables 19 to 23 below, different types of TCI states need to be set for each TRS, NZP CSI-RS for channel state information (CSI) (without repetition) (hereinafter, it may be interchangeably used with CSI-RS (CSI)), NZP CSI-RS for beam management (BM) (with repetition) (hereinafter, it may be interchangeably used with CSI-RS (BM)), control channel, and data.

Such a TCI state may be set in NZP CSI-RS for CSI (without repetition), NZP CSI-RS for beam management (BM) (with repetition), and control channels by RRC signaling, and one TCI state to be used in each case may be set via RRC signaling. In addition, in the case of a control channel, after setting a plurality of TCI states, the TCI state to be used may be indicated using an MAC CE, and the TCI state for data may be indicated through downlink control information for scheduling the corresponding data when tci-PresentInDCI is set to be enabled.

TABLE 19

| Valid TCI state Configuration | DL RS 1 | qcl-Type1 | DL RS 2 (if configured) | qcl-Type2 (if configured) |
|---|---|---|---|---|
| 1* | SS/PBCH Block | QCL-TypeC | SS/BCH Block | QCL-TYPeD |
| 2* | SS/PBCH Block | QCL-TypeC | CSI-RS (BM) | QCL-TypeD |

TABLE 20

| Valid TCI state Configuration | DL RS 1 | qcl-Type1 | DL RS 2 (if configured) | qcl-Type2 (if configured) |
|---|---|---|---|---|
| 1** | TRS | QCL-TypeA | SS/PBCH Block | QCL-TypeD |
| 2** | TRS | QCL-TypeA | CSI-RS (BM) | QCL-TypeD |
| 3* | TRS | QCL-TypeB | | |

TABLE 21

| Valid TCI state Configuration | DL RS 1 | qcl-Type1 | DL RS 2 (if configured) | qcl-2-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

TABLE 22

| Valid TCI state Configuration | DL RS 1 | gcl-Type1 | DL RS 2 if configured | gcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | | |
| 4 | SS/PBCH Block* | QCL-TypeA | SS/PBCH Block* | QCL-TypeD |

TABLE 23

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In particular, all the PDCCH, PDSCH, and NZP CSI-RS may receive the configuration of a TRS based on a beam reference signal, whereas the TRS is required to receive the configuration of SSB and CSI-RS (BM) based on the beam reference signals, and thus the TCI states need to be used independently. Table 24 illustrates an example in which the TCI states are divided and separately used.

TABLE 24

| Beam Change | | | CSI-RS (BM) |
|---|---|---|---|
| PDCCH | CSI-RS (CSI) | TRS | Usage |
| MAC CE (Up to 21 beams) (limited by UE capability) | DCI (Up to 21 beams) | UE's selection (Up to 21 beams) (limited by UE capability) | MAC CE (Up to 21 beams) limited by UE capability) |

As shown in Table 24, a total of 64 TCI states are divided and separately used by the PDCCH, CSI-RS (CSI), CSI-RS (BM), and TRS, and thus up to 21 beams can be supported. In order to solve the problem of limiting the number of beams that can be supported, the maximum number of TCI states is calculated for each of the PDCCH, CSI-RS (CSI), CSI-RS (BM), and TRS in a separate manner, and thus more beams can be supported without RRC reconfiguration.

The first method is a method for supporting up to 64 TCI states for each of TRS, CSI-RS (BM), CSI-RS (CSI), PDCCH, and PDSCH. According to the method, the base station receives a large number of beam degrees of freedom to flexibly support the coverage of the corresponding cell.

The second method is a method in which four groups of TRS, CSI-RS (CSI), CSI-RS (BM), and PDCCH/PDSCH each supports 64 TCI states. In the case of the PDCCH and the PDSCH, since TCI states except for the third valid TCI state setting are easy to share, the second method can be used.

The third method is a method in which three groups of TRS, CSI-RS (CSI), and CSI-RS (BM)/PDCCH/PDSCH each supports 64 TCI states. Since CSI-RS (BM) also shares many similar settings, the TCI states can be grouped and used easily.

The fourth method is a method in which two groups of TRS and CSI-RS (CSI)/CSI-RS (BM)/PDCCH/PDSCH are grouped to support 64 TCI states, respectively. This method has the advantage of minimizing the increase in the UE complexity.

The TCI state of the method above may be set via RRC signaling.

In the above, a beam supporting method through divided setting of TCI states and increasing the number of TCI states is described, and a dynamic beam indication method through a semi-persistent CSI-RS setting is described below.

Figure 15:
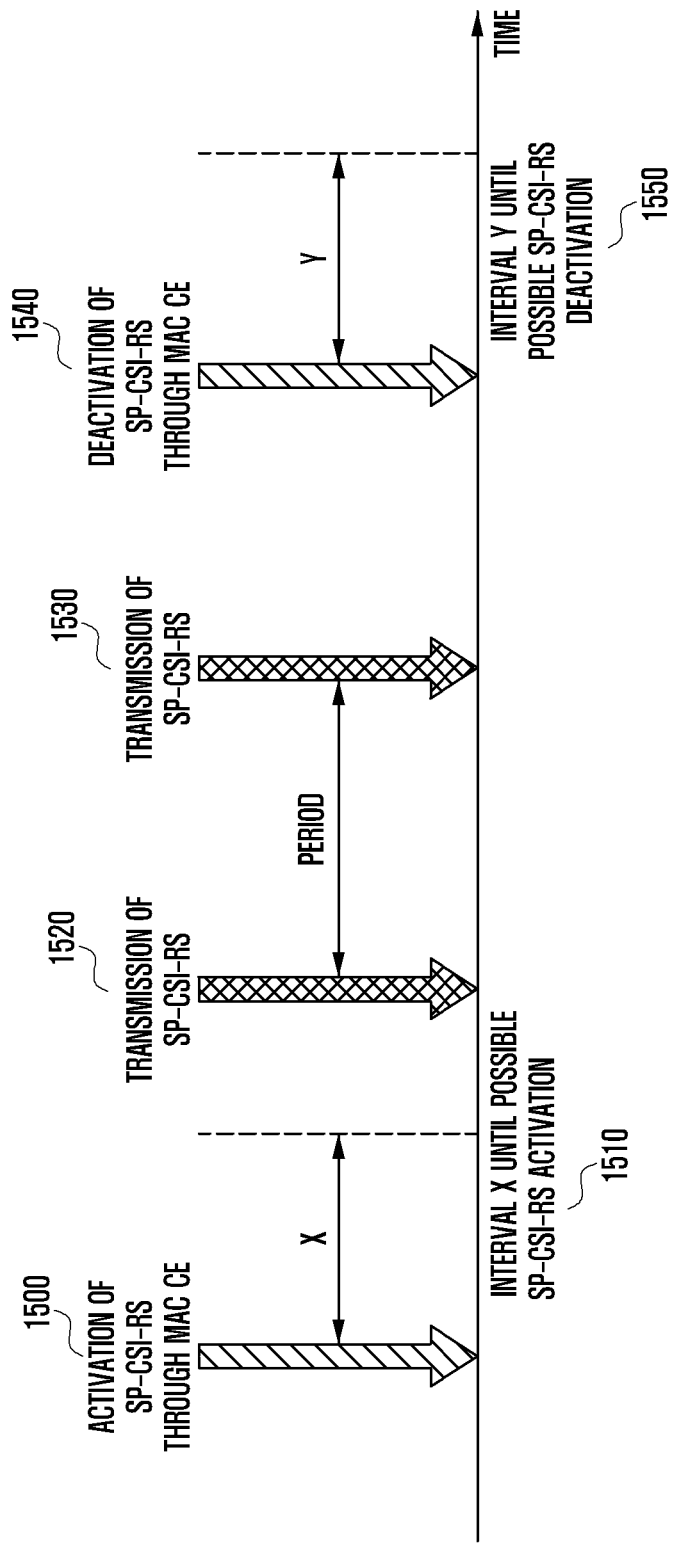
FIG. 15 illustrates semi-persistent CSI-RS setting, activation, and deactivation operations.

FIG. 15 illustrates an example of a semi-persistent CSI-RS setting and activation/deactivation operation.

As mentioned above, a base station may set a plurality of resources through an RRC and activate or deactivate all or a part of the semi-persistent CSI-RS (SP-CSI-RS) through an MAC CE (indicated by reference numeral 1500). Here, until the semi-persistent CSI-RS is activated, X time is required after MAC CE reception (indicated by reference numeral 1510). Thereafter, the base station transmits the semi-persistent CSI-RS to the UE (indicated by reference numeral 1520). Thereafter, the base station deactivates the semi-persistent CSI-RS through the MAC CE (indicated by reference numeral 1540). Until the semi-persistent CSI-RS is deactivated, Y time is required after MAC CE reception (indicated by reference numeral 1550). Since the MAC CE used for such activation and deactivation can be transmitted reliably through transmission confirmation through the ACK/NACK transmission of the UE, there is an advantage in that the UE does not erroneously determine whether the base station activates or deactivates the CSI-RS resource.

Table 25 shows the MAC CE signals for activation and deactivation of semi-persistent CSI-RS.

TABLE 25

| A/D | | Serving Cell ID | BWP ID | Oct 1 |
|---|---|---|---|---|
| R | IM | SP CSI-RS resource set ID | | Oct 2 |
| R | R | SP CSI-IM resource set ID | | Oct 3 |
| R | R | TCI State ID$_0$ | | Oct 4 |
| | | ... | | |
| R | R | TCI State ID$_N$ | | Oct N + 4 |

The signals in the above table may be described as follows.
   A/D: 1 indicates activation, and 0 indicates deactivation
   Serving Cell ID: ID of cell to which MAC CE is applied
   BWP ID: BWP ID to which MAC CE will be applied
   SP CSI-RS resource set ID: Semi-persistent CSI-RS resource set ID to which activation and deactivation will be applied
   IM: Whether semi-persistent CSI-IM is activated or deactivated. 1 indicates activation, and 0 indicates that CSI-IM set mapped to corresponding ID does not exist.
   SP CSI-IM resource set ID: SP CSI-IM resource set ID
   TCI State IDi: TCI state ID
   R: Reserved bit, set to "0".

Here, in the semi-persistent CSI-RS, beam information may be dynamically changed using the MAC CE. For example, by transmitting the activated MAC CE to the already activated semi-persistent CSI-RS again together with the changed TCI state ID, dynamic change of the beam information is possible.

However, in the case of the NR phase 1 TRS, since a QCL connection relationship between the periodic CSI-RS resource set and the aperiodic CSI-RS resource set connected to a periodic CSI-RS is absolutely necessary, dynamic beam change using the semi-persistent CSI-RS is impossible. Accordingly, as shown in Table 17, only up to 21 beams can be dynamically changed and used for the TRS. Therefore, the following scheme can be considered in order to solve this problem.
   Dynamic beam change scheme 1 for TRS: Semi-persistent TRS is supported
   Dynamic beam change scheme 2 for TRS: Semi-persistent CSI-RS setting is supported using QCL-Type D of periodic CSI-RS
   Dynamic beam change scheme 3 for TRS: Semi-persistent CSI-RS setting is supported using QCL-Type D of periodic TRS
   Dynamic beam change scheme 4 for TRS: Allows beam change through MAC CE only for periodic CSI-RSs configured as QCL-Type D of periodic TRS.

The dynamic beam change scheme 1 for the TRS is a method of supporting semi-persistent TRS. The semi-persistent TRS is based on the semi-persistent CSI-RS resource set, and accordingly, dynamic beam change through MAC CE is allowed. Therefore, it is possible to support dynamic beam change of the TRS.

The dynamic beam change scheme 2 for TRS is a method of supporting semi-persistent CSI-RS setting by using a reference signal according to QCL-Type D of a periodic CSI-RS. Currently, for periodic CSI-RS, only periodic CSI-RS or SSB can be set as a reference signal according to QCL Type-D. This is made by considering that transmission of the corresponding reference signal may not occur during periodic CSI-RS transmission since the periodic CSI-RS is a signal that needs to be persistently and periodically transmitted before resetting the RRC, but the aperiodic CSI-RS or semi-persistent CSI-RS is a signal capable of DCI-based transmission and activation and deactivation. Therefore, only the current periodic CSI-RS can be referred to for the periodic CSI-RS. However, this restriction is released for MAC CE-based dynamic beam indication, and thus semi-persistent CSI-RS setting based on a reference signal may be supported according to QCL-type D of the periodic CSI-RS.

Dynamic beam change scheme for TRS 3 is a method of supporting semi-persistent CSI-RS setting based on a reference signal according to QCL-Type D of periodic TRS. As mentioned above, only the periodic CSI-RS can be referred to for the periodic CSI-RS, by considering that transmission of the corresponding reference signal may not occur during periodic CSI-RS transmission since the periodic CSI-RS is a signal that needs to be persistently and periodically transmitted before resetting the RRC, but the aperiodic CSI-RS or semi-persistent CSI-RS is a signal capable of DCI-based transmission and activation and deactivation. However, unlike scheme 2, it is possible to enable MAC CE-based dynamic beam indication by enabling the semi-persistent CSI-RS to be configured according to a QCL Type-D reference signal only in the CSI-RS resource set in which the corresponding CSI-RS resource set is configured through TRS (CSI-RS for tracking), rather than allowing semi-persistent CSI-RS to be enabled at the time of setting the QCL Type-D reference signal of all periodic CSI-RSs.

Dynamic beam change scheme 4 for TRS is a method for allowing beam change through the MAC CE only in the periodic CSI-RS configured based on the QCL-Type D reference signal of the periodic TRS. As mentioned above, since the semi-persistent CSI-RS is a signal that can be activated and deactivated, the corresponding reference signal transmission may not occur during periodic CSI-RS transmission. Accordingly, in the case of the periodic CSI-RS, which is used as the QCL Type-D reference signal of the TRS, the beam change through the MAC CE is allowed so as to support dynamic beam change.

As mentioned above, transmission of the corresponding reference signal may not occur during periodic CSI-RS transmission because the periodic CSI-RS is a signal that needs to be persistently and periodically transmitted before resetting the RRC, but the aperiodic CSI-RS or semi-persistent CSI-RS is a signal capable of DCI-based transmission and activation and deactivation. Therefore, when a corresponding semi-persistent CSI-RS is configured based on a periodic CSI-RS or a QCL Type-D reference signal of a TRS, the above problem can be solved using the following method.

First, it may be assumed that the semi-persistent CSI-RS is always activated regardless of the MAC CE. Therefore, the semi-persistent CSI-RS has the same transmission type as that of the periodic CSI-RS (that is, the corresponding semi-permanent CSI-RS is periodically transmitted when RRC is set even without transmission of active MAC CE), but only dynamic beam change through MAC CE is possible.

Second, a deactivated MAC CE for the semi-persistent CSI-RS may enable the UE not to receive or to disregard a deactivation message. The UE receives only the activation message of the semi-persistent CSI-RS and does not receive the deactivation message (that is, when the UE receives the activated MAC CE, the CSI-RS is periodically transmitted, and beam change through the MAC CE is possible). The semi-persistent CSI-RS has the same transmission type as that of periodic CSI-RS, but only dynamic beam change is enabled through the MAC CE.

Third, if the semi-persistent CSI-RS configured based on the QCL Type-D reference signal of the TRS is deactivated, the UE identifies that the transmission of the control channel or data channel indicated through the corresponding TRS is not to be performed, and does not support time and frequency tracking through the corresponding TRS. That is, when the UE receives the MAC CE for deactivating the semi-persistent CSI-RS configured based on the QCL Type-D reference signal of the TRS, the UE does not perform time and frequency tracking through the corresponding TRS. Accordingly, although direct activation and deactivation of the TRS is not supported, activation and deactivation of the TRS may be indirectly supported.

In the above, only a method for dynamic beam change of a TRS is suggested, but this method is also applicable to a reference signal, a control channel (e.g., PDCCH), and a data channel (e.g., PDSCH). For example, when a semi-persistent CSI-RS is configured based on a QCL Type-D reference signal in the TCI state for PDCCH transmission, the semi-persistent CSI-RS is always assumed to be active, or the UE is allowed to disregard or not to receive the deactivation message.

In NR, the above-mentioned beam change operation is performed for each channel and component carrier (CC).

Figure 16:
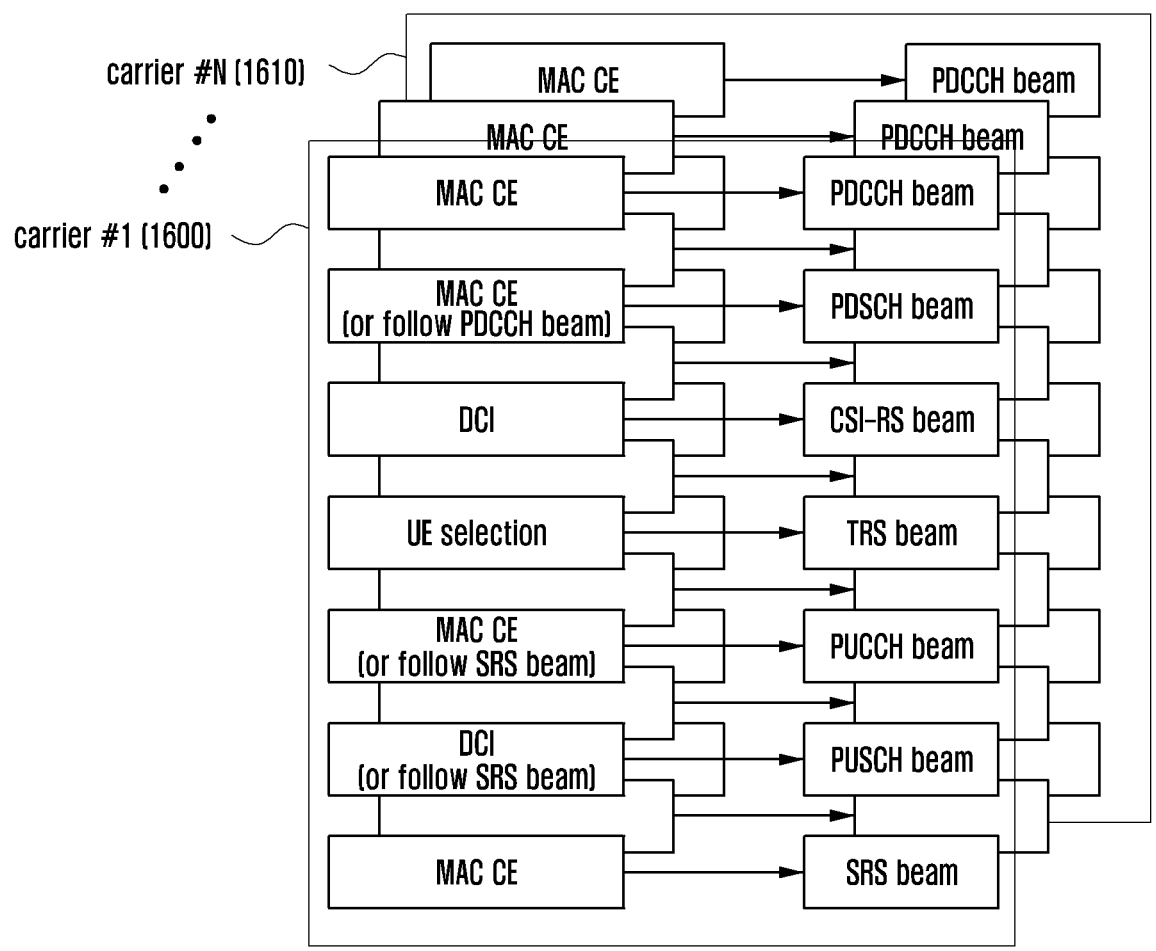
FIG. 16 illustrates an example of beam change operation for each channel and CC in NR.

FIG. 16 illustrates an example of a beam change operation for each channel and CC in NR.

As shown in FIG. 16, in NR, a signal (hereinafter, a beam change signal) capable of setting and changing a different beam for each channel and each CC, such as an uplink or downlink, a control channel, and a shared channel is used. Reference numeral 1600 denotes a beam change signal of a reference signal and each channel of carrier #1, and reference numeral 161 denotes a beam change signal of a reference signal and each channel of carrier #n.

According to FIG. 16, as an example, a PDCCH (transmission/reception) beam is configured using a TCI for a PDCCH indicated through an MAC CE, and a PDSCH beam may be identified by the MAC CE (and DCI) or a PDCCH beam for scheduling a PDSCH. The PUSCH beam may be determined by a beam applied to an SRS, indicated or configured using DCI, MAC CE, and/or RRC, and the SRS beam may be configured through the RRC, MAC CE, and/or DCI. The PUCCH beam may be determined by a beam applied to the SRS indicated using the RRC and/or MAC CE.

In the case of CSI-RS, the beam of the periodic CSI-RS is configured via RRC signaling; in the case of semi-persistent CSI-RS, the TCI state configured via RRC signaling may be indicated by the MAC CE when the corresponding CSI-RS resource is activated; and in the case of aperiodic CSI-RS, a beam is indicated using a TCI state connected to a corresponding aperiodic CSI and a CSI-RS trigger state. TRS has periodic and aperiodic TRS; since the periodic TRS is configured to track time and frequency resources based on CSI-RS, beam information is configured via RRC signaling in the same method as that of the periodic CSI-RS; and the aperiodic TRS is based on the aperiodic CSI-RS, but is dependent on information of periodic TRS, and thus the same beam as beam information of periodic TRS needs to be used.

Accordingly, it is possible to apply a plurality of panels, a plurality of RF chains, and a plurality of beams based on a digital beam, and use beams having different coverages or reliabilities between a control channel and a shared channel. However, when the base station and the UE are implemented as one panel, or when only one beam is used even if a plurality of panels are used, this flexibility has a disadvantage of increasing signaling overhead and only delay time due to beam change. Therefore, the disclosure describes a method for instructing a base station or a UE to perform beam change through one signaling.

Figure 17:
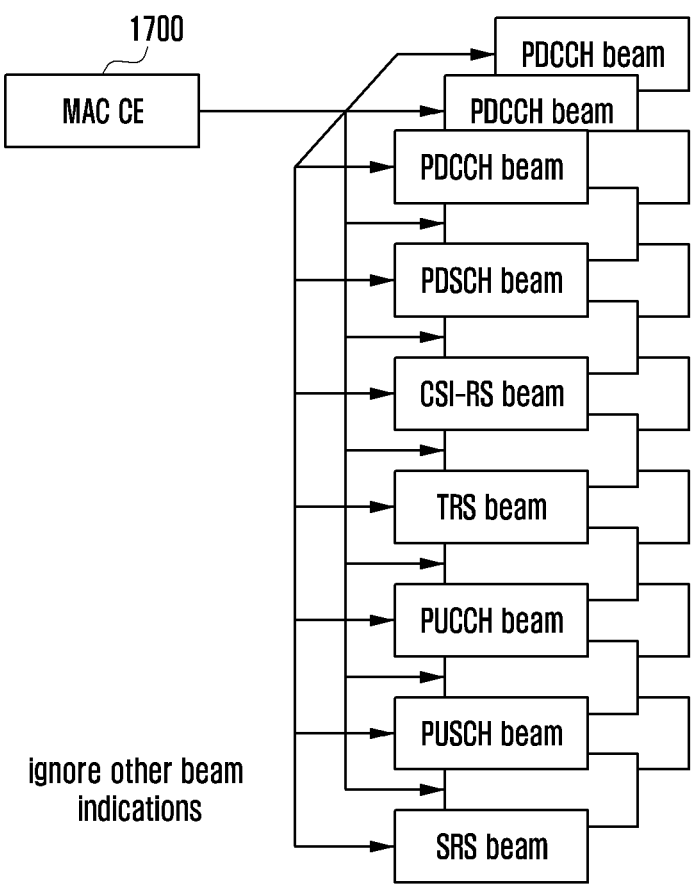
FIG. 17 illustrates an example of changing beams of a plurality of channels and CCs by using one beam change signal proposed in the disclosure.

FIG. 17 illustrates an example of changing beams of a plurality of channels and CCs by using one beam change signal proposed in the disclosure.

As shown in FIG. 17, when a UE receives, for a specific CC, a beam change signal 1700 of one of the PDCCH, PDSCH, PUCCH, or PUSCH, the UE may allow a corresponding beam indicated by the beam change signal to be applied regardless of a CC and a channel (which may include a reference signal) such as the PDCCH, PDSCH, PUCCH, or PUSCH indicated by the corresponding beam change. A method of applying a beam change signal regardless of the channel and the CC may be as follows.

Method 1 of applying a beam change signal regardless of a channel and a CC: Downlink, uplink, and channel indicated (by the beam change signal) and beam information indicated regardless of CC are applied to all channels and CCs Method 2 of applying a beam change signal regardless of a channel and a CC: If beam change information is for a primary cell (PCell) (or a primary secondary cell (PSCell)), the beam change information is applied to all channels and CCs Method 3 of applying a beam change signal regardless of a channel and a CC: If beam change information corresponds to a control channel, the beam change information is applied to all channels and CCs.

Method 4 of applying a beam change signal regardless of a channel and a CC: Beam change information corresponding to downlink or uplink is applied to all channels and CCs Method 1 of applying a beam change signal regardless of a channel and a CC is a method of applying indicated beam information to all channels and CCs regardless of the indicated downlink, uplink, and channel. According to the method, even if the beam change information for a predetermined channel and CC is indicated under the assumption that the beam information indicated to the UE is applied equally to all channels and CCs, the same beam change according to the beam change information is applied to all channels and CCs.

Method 2 of applying the beam change signal regardless of a channel and a CC is a method of applying information corresponding to the Pcell to all channels and CCs. Currently, since all beam-related configurations exist separately for each channel and CC, a mismatch may occur in RRC configuration required for beam change when the same beam change is applied to all channels and CCs. Therefore, by reflecting only the beam change signal for the PCell or PSCell, the (base station and the UE) may operate based on the RRC configuration set for the Pcell or PScell, and thereby preventing this mismatch from occurring. To this end, the UE may disregard or not expect the reception of a beam change signal for a CC other than a Pcell or PScell.

Method 3 of applying a beam change signal regardless of a channel and a CC is a method of applying beam change information corresponding to a control channel to all channels and CCs. Since the TCI state for the control channel and the TCI state for the shared channel mentioned above are set separately, a mismatch may occur as well. Therefore, by applying the beam change information corresponding to the control channel to all channels, such a mismatch can be prevented from occurring. To this end, the UE may not expect or may disregard the reception of a beam change signal for the shared channel (which may include a PUSCH and/or PDSCH) other than the control channel. This control channel may include a PDCCH, a PUCCH, and/or a reference signal.

Method 4 of applying a beam change signal regardless of a channel and a CC is a method of applying beam change information corresponding to downlink or uplink to all channels and CCs. The base station and the UE can minimize beam change signaling by making a beam change corresponding to one link to be equally applied to the other link. To this end, the UE may not expect or may disregard a beam change signal for a link (e.g., uplink) other than a corresponding link (e.g., downlink), otherwise vice versa.

The method of applying the beam change signal may be performed by combining a plurality of methods. For example, by simultaneously applying beam change signal application methods 2 and 3, only the beam change signal corresponding to the Pcell and control channel is applied to all channels and CCs so as to minimize signaling. In addition, by additionally applying beam change signal application method 4, it is possible to apply a downlink (beam change) signal to an uplink reference signal and a channel. In addition, although only the control channel, the shared channel, and a plurality of CCs are considered above, the same method is applied to the uplink and downlink reference signals and thus it is possible to perform beam change by applying one beam change signal to the uplink and downlink reference signals.

In addition, although the case where beam change is applied to all channels and CCs has been described above, it is possible to apply one separate beam change signal to all channels and CCs for each link (downlink or uplink), to apply one separate beam change signal for each channel (e.g., a control channel for uplink and downlink of all CCs or a shared channel for uplink and downlink of all CCs, etc.), or to support one beam change signal for all channels regardless of uplink and downlink for each CC. For example, when the MAC CE, which is a beam change signal for the PDCCH, is received, the UE applies this signal to the downlink channels of all CCs, or to the control channels of uplink and downlink of all CCs, or to all channels of CC to which the MAC CE is transmitted.

In order to identify whether the corresponding UE is a UE supporting only one beam to support the above operation, signaling related to the UE capability (UE capability signaling) as shown in Table 26 may be supported.

TABLE 26

| # | Feature group | Components | Pre-requisite feature groups | Need for gNB to know whether the feature is supported by the UE | Consequences if the feature is not supported by the UE | Type (see R2-1712078) | Need of FDD/TDD differentiation | Need of FR1/FR2 differentiation | RAN 5 implication | Note |
|---|---|---|---|---|---|---|---|---|---|---|
| 2-20 | Beam correspondence | 1. Support Beam correspondence 2. When CA is configured, whether the same beam correspondence relationship | | Yes | Beam correspondence is not supported | Type 1 | No need | N.A. | | Note: Beam correspondence means each Tx port can be beamformed in a desirable direction |

TABLE 26-continued

| # | Feature group | Components | Pre-requisite feature groups | Need for gNB to know whether the feature is supported by the UE | Consequences if the feature is not supported by the UE | Type (see R2-1712078) | Need of FDD/TDD differentiation | Need of FR1/FR2 differentiation | RAN 5 implication | Note |
|---|---|---|---|---|---|---|---|---|---|---|
| | | for beam management is supported across CCs. Note: RAN4 to check the feasibility for component-2, e.g. intra-band or inter-band | | | | | | | | but does not imply setting phase across ports |

Here, when the UE has reported "Yes" with regard to "When CA is configured, whether the same beam correspondence relationship for beam management is supported across CCs.", that is component-2 of the UE capability, a method of applying one beam change signal regardless of a channel and a CC to a UE, proposed in the disclosure, is applied. Otherwise, the method proposed in the disclosure is not applied and the existing beam change method may be followed.

In addition, in addition to the UE capability signaling, an RRC field for configuring an operation proposed in the disclosure may independently exist. Here, the beam change operation described above occurs when the RRC field is configured for the UE by the base station, or the beam change operation may be performed when both the RRC field configuration by the base station and the UE capability signaling report by the UE are made.

Figure 18:
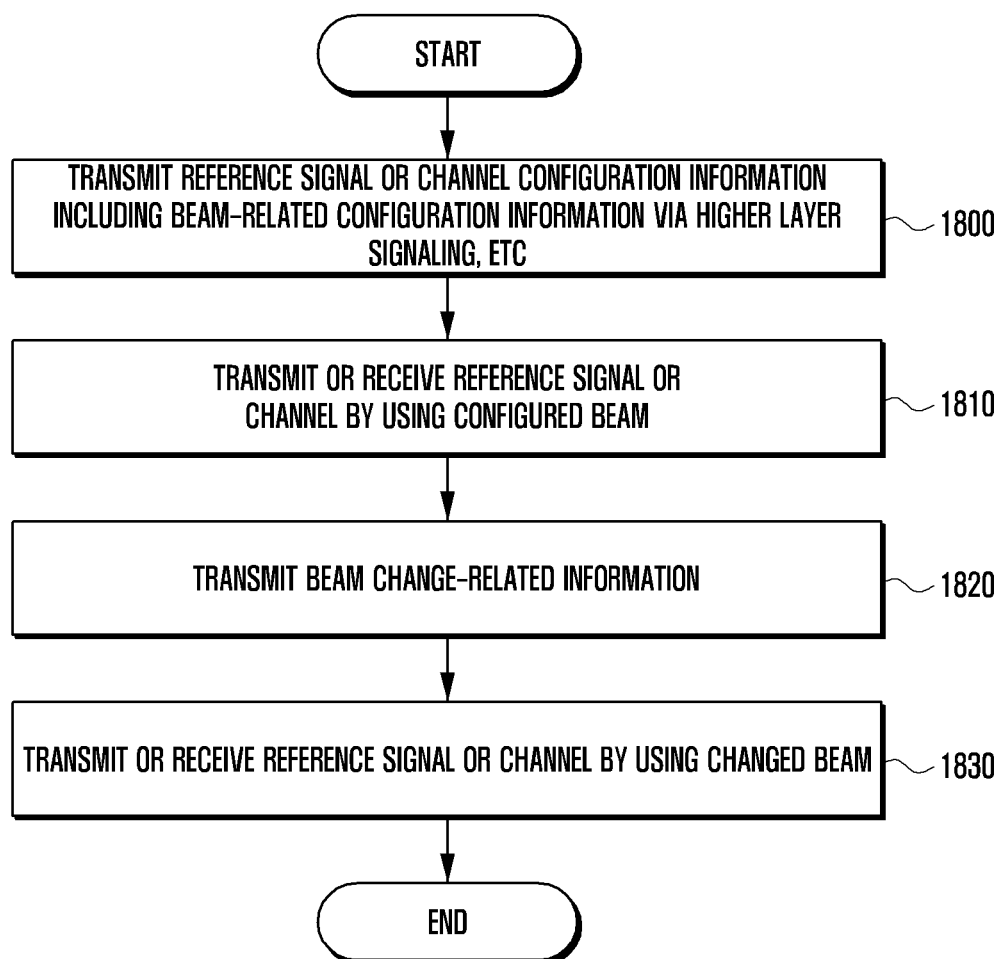
FIG. 18 illustrates an operation of a base station according to an embodiment of the disclosure.

FIG. 18 illustrates an operation of a base station according to an embodiment of the disclosure. Referring to FIG. 18, in operation 1800, the base station transmits a reference signal or/and channel configuration information to a UE via higher layer signaling and the like. For details of the configuration information, the above description may be referred to. The configuration information may include beam-related configuration information for a reference signal or/and a channel. The beam-related configuration information includes TCI state information, and the TCI state information may indicate a QCL type and reference signal information. In operation 1810, the base station may transmit or receive a reference signal or a channel to or from the UE by using the configured beam.

In operation 1820, the base station determines beams that need to be applied to the channel or the reference signal or need to be changed, and transmits beam change-related information to the UE. The beam change-related information may be a (beam change) MAC CE for a semi-persistent TRS according to the dynamic beam change scheme of a TRS, a (beam change) MAC CE for a semi-persistent CSI-RS configured as a QCL type-D reference signal in the TRS, or an MAC CE, DCI, or RRC reconfiguration message for changing the beam according to the description of FIG. 16. The UE having received the beam change-related information may apply the beam change-related information to a specific reference signal or channel of a specific CC. However, the UE may change one or more beams by performing an operation of applying the beam change-related information to all reference signals and channels of all CCs, or to all channels and reference signals of a specific CC. In addition, this operation may be performed when the UE reports the UE capability that the UE supports one beam. In operation 1830, the base station transmits or receives a reference signal or a channel to or from the UE by using the changed beam.

Figure 19:
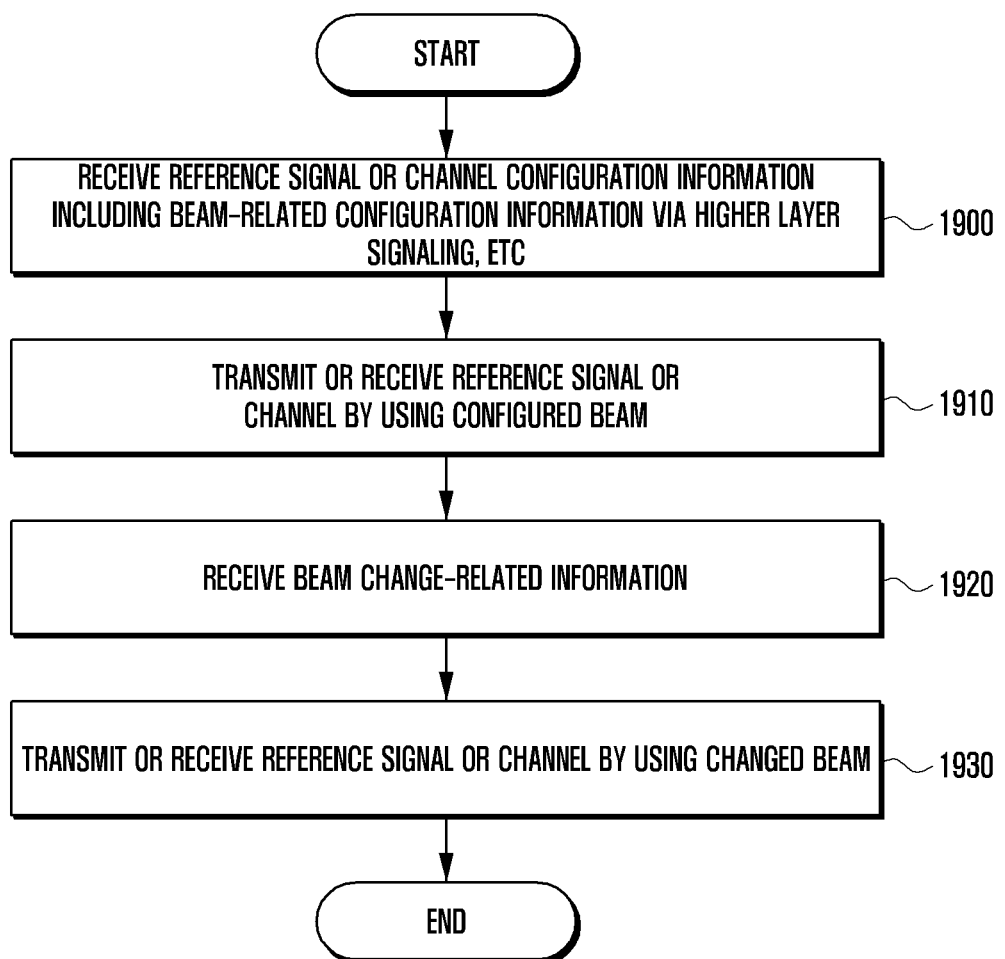
FIG. 19 illustrates an operation of a UE according to an embodiment of the disclosure.

FIG. 19 illustrates an operation of a UE according to an embodiment of the disclosure. Referring to FIG. 19, in operation 1900, the UE receives a reference signal or/and channel configuration information from a base station via higher layer signaling and the like. For details of the configuration information, the above description may be referred to. The configuration information may include beam-related configuration information for a reference signal or/and a channel. The beam-related configuration information includes TCI state information, and the TCI state information may indicate a QCL type and reference signal information. In operation 1910, the UE may transmit or receive a reference signal or a channel to or from the base station by using the configured beam.

In operation 1920, the UE may receive beam change-related information from the base station. The beam change-related information may be a (beam change) MAC CE for a semi-persistent TRS according to the dynamic beam change scheme of a TRS, a (beam change) MAC CE for a semi-persistent CSI-RS configured as a QCL type-D reference signal in the TRS, or an MAC CE, DCI, or RRC reconfiguration message for changing the beam according to the description of FIG. 16. The UE having received the beam change-related information may apply the beam change-related information to a specific reference signal or channel of a specific CC. However, the UE may change one or more beams by performing an operation of applying the beam change-related information to all reference signals and channels of all CCs, or to all channels and reference signals of a specific CC. In addition, this operation may be performed when the UE reports the UE capability that the UE supports one beam. In operation 1930, the UE transmits or receives a reference signal or a channel to or from the base station by using the changed beam.

Figure 20:
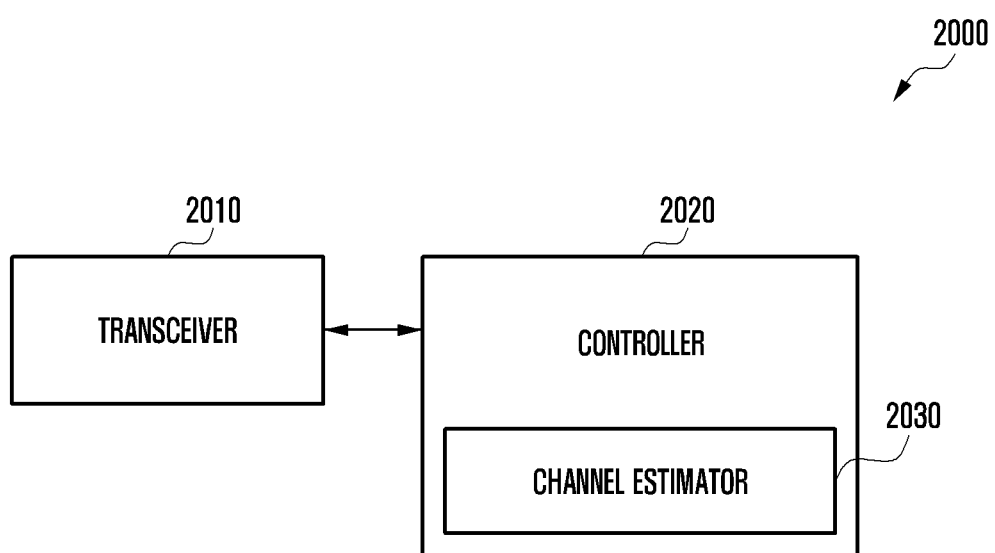
FIG. 20 is a block diagram illustrating the internal structure of a UE.

FIG. 20 is a block diagram illustrating the internal structure of a UE according to an embodiment of the disclosure.

Referring to FIG. 20, a UE 2000 includes a transceiver 2010 and a controller 2020. The transceiver 2010 performs a function of transmitting or receiving data to or from the outside (e.g., a base station). Here, the transceiver 2010 may transmit a reference signal and a channel to which a beam is applied to the base station under the control of the controller 2020. The controller 2020 controls the state and operation of all elements configuring the UE. Specifically, the controller 2020 controls the transceiver 2010 to generate and transmit the reference signal and channel to which a beam is applied according to the beam-related information received from the base station. In addition, the controller may generate feedback information according to information allocated from the base station and provide feedback to the base station. To this end, the controller 2020 may include a channel estimator 2030. The channel estimator 2030 determines the position of the corresponding resource in time and frequency resources through service and feedback information received from the base station, and identifies required feedback information through CSI-RS and feedback allocation information related thereto. The channel estimator may estimate a channel by using a CSI-RS received based on the feedback information.

In FIG. 20, an example in which the UE includes the transceiver 2010 and the controller 2020 is described, but the disclosure is not limited thereto, and various configurations may be further provided according to functions performed by the UE. For example, the UE may further include a display for displaying the current state of the UE, an input unit to which a signal such as function execution from a user is input, and a storage for storing data generated in the UE. In addition, although the channel estimator 2030 is shown to be included in the controller 2020, the disclosure is not limited thereto.

Figure 21:
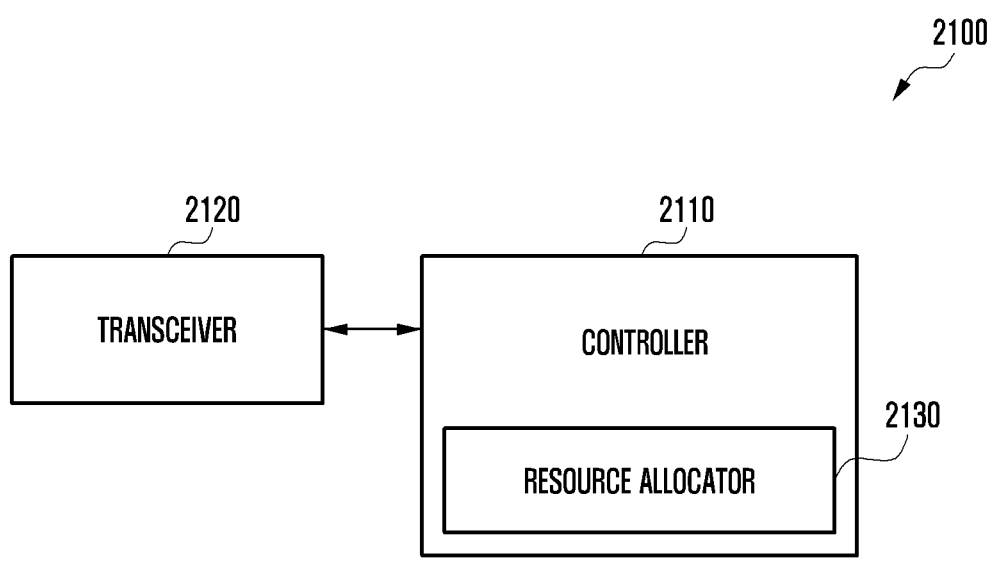
FIG. 21 is a block diagram illustrating the internal structure of a base station according to an embodiment of the disclosure.

FIG. 21 is a block diagram illustrating the internal structure of a base station according to an embodiment of the disclosure.

Referring to FIG. 2, a base station 2100 includes a controller 2110 and a transceiver 2120. The controller 2110 controls the state and operation of all elements configuring the base station. Specifically, the controller 2110 transmits beam-related configuration information to the UE, allocates CSI-RS resources, and allocates a feedback resource and a feedback timing to the UE. To this end, the controller 2110 may further include a resource allocator 2130. In addition, the controller allocates feedback configuration and feedback timing so that feedback from multiple UEs does not collide, and receives and analyzes feedback information configured at the corresponding timing. The transceiver 2120 transmits beam-related configuration information to the UE, and performs a function of transmitting or receiving a channel to which a beam is applied, a reference signal, data, and feedback information. Here, the transceiver 2120 transmits the CSI-RS to the UE through resources allocated under the control of the controller 2110, and receives feedback relating to channel information from the UE. In the above, the resource allocator 2130 is shown to be included in the controller 2110, but is not limited thereto.

The invention claimed is:

1. A method performed by a user equipment (UE) in a wireless communication system, the method comprising:
   receiving, from a base station, beam change information for a downlink shared channel for a cell, wherein the beam change information includes transmission configuration indicator (TCI) state information for the downlink shared channel;
   identifying a set of a plurality of component carriers to apply the beam change information; and
   receiving, from the base station, data on the downlink shared channel, on a component carrier among the plurality of component carriers, based on a TCI state according to the beam change information,
   wherein the TCI state information in the beam change information is applied to downlink shared channels on the plurality of component carriers.

2. The method of claim 1, wherein the beam change information is applied based on higher layer signaling configuring a beam change is applied to the plurality of component carriers.

3. The method of claim 1, wherein the beam change information corresponds to a medium access control (MAC) control element indicating activation.

4. The method of claim 1, further comprising:
   receiving, from the base station, downlink control information for the downlink shared channel, the downlink control information including an indicator indicating the TCI state for the downlink shared channel based on the beam change information.

5. The method of claim 1, further comprising:
   transmitting, to the base station, capability information associated with the beam change information for the set of the plurality of component carriers.

6. A method performed by a base station in a wireless communication system, the method comprising:
   transmitting, to a terminal, beam change information for a downlink shared channel for a cell, wherein the beam change information is to be applied to a set of a plurality of component carriers, and the beam change information includes transmission configuration indicator (TCI) state information for the downlink shared channel; and
   transmitting, to the terminal, data on the downlink shared channel on a component carrier among the set of the plurality of component carriers,
   wherein a TCI state of the downlink shared channel on the component carrier is associated with the beam change information, and
   wherein the TCI state information in the beam change information is applied to downlink shared channels on the plurality of component carriers.

7. The method of claim 6, wherein the beam change information to be applied is based on higher layer signaling configuring a beam change is applied to the plurality of component carriers.

8. The method of claim 6, wherein the beam change information corresponds to a medium access control (MAC) control element indicating activation.

9. The method of claim 6, further comprising:
   transmitting, to the terminal, downlink control information for the downlink shared channel, the downlink control information including an indicator indicating the TCI state for the downlink shared channel based on the beam change information.

10. The method of claim 6, further comprising:
   receiving, from the terminal, capability information associated with the beam change information for the set of the plurality of component carriers.

11. A terminal in a wireless communication system, the terminal comprising:
a transceiver; and
a controller coupled with the transceiver and configured to:
receive, from a base station, beam change information for a downlink shared channel for a cell, wherein the beam change information includes transmission configuration indicator (TCI) state information for the downlink shared channel,
identify a set of a plurality of component carriers to apply the beam change information and
receive, from the base station, data on the downlink shared channel, on a component carrier among the plurality of component carriers, based on a TCI state according to the beam change information,
wherein the TCI state information in the beam change information is applied to downlink shared channels on the plurality of component carriers.

12. The terminal of claim 11, wherein the beam change information is applied based on higher layer signaling configuring a beam change is applied to the plurality of component carriers.

13. The terminal of claim 11, wherein the beam change information corresponds to a medium access control (MAC) control element indicating activation.

14. The terminal of claim 11, wherein the controller is further configured to receive, from the base station, downlink control information for the downlink shared channel, the downlink control information including an indicator indicating the TCI state for the downlink shared channel based on the beam change information.

15. The terminal of claim 11, wherein the controller is further configured to transmit, to the base station, capability information associated with the beam change information for the set of the plurality of component carriers.

16. A base station in a wireless communication system, the base station comprising:
a transceiver; and
a controller coupled with the transceiver and configured to:
transmit, to a terminal, beam change information for a downlink shared channel for a cell, wherein the beam change information is to be applied to a set of a plurality of component carriers, and the beam change information includes transmission configuration indicator (TCI) state information for the downlink shared channel, and
transmit, to the terminal, data on the downlink shared channel on a component carrier among the set of the plurality of component carriers,
wherein a TCI state of the downlink shared channel on the component carrier is associated with the beam change information, and
wherein the TCI state information in the beam change information is applied to downlink shared channels on the plurality of component carriers.

17. The base station of claim 16, wherein the beam change information to be applied is based on higher layer signaling configuring a beam change is applied to the plurality of component carriers.

18. The base station of claim 16, wherein the beam change information corresponds to a medium access control (MAC) control element indicating activation.

19. The base station of claim 16, wherein the controller is further configured to transmit, to the terminal, downlink control information for the downlink shared channel, the downlink control information including an indicator indicating the TCI state for the downlink shared channel based on the beam change information.

20. The base station of claim 16, wherein the controller is further configured to receive, from the terminal, capability information associated with the beam change information for the set of the plurality of component carriers.

* * * * *